United States Patent
Hoskins

(10) Patent No.: US 6,789,132 B2
(45) Date of Patent: Sep. 7, 2004

(54) MODULAR DISC DRIVE ARCHITECTURE

(75) Inventor: Edward Sean Hoskins, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 591 days.

(21) Appl. No.: 09/773,458

(22) Filed: Jan. 31, 2001

(65) Prior Publication Data

US 2002/0002655 A1 Jan. 3, 2002

Related U.S. Application Data

(60) Provisional application No. 60/181,164, filed on Feb. 9, 2000.

(51) Int. Cl.$^7$ .................................................. G06F 3/00
(52) U.S. Cl. .............................. 710/5; 710/6; 710/29; 710/58; 710/36; 703/23; 703/24; 711/158; 711/167
(58) Field of Search ............................ 710/5, 29, 58, 710/6, 36; 703/24, 23; 711/106, 158, 167

(56) References Cited

U.S. PATENT DOCUMENTS

| | | |
|---|---|---|
| 5,193,189 A | 3/1993 | Flood et al. |
| 5,276,662 A | 1/1994 | Shaver, Jr. et al. |
| 5,291,614 A | 3/1994 | Baker et al. |
| 5,394,547 A | 2/1995 | Correnti et al. |
| 5,548,795 A | 8/1996 | Au |
| 5,570,332 A | 10/1996 | Heath et al. |
| 5,664,143 A | 9/1997 | Olbrich |
| 5,729,718 A | 3/1998 | Au |
| 5,787,482 A | 7/1998 | Chen et al. |
| 6,003,101 A | 12/1999 | Williams |
| 6,032,207 A | 2/2000 | Wilson |
| 6,038,585 A | 3/2000 | Togawa |
| 6,047,308 A | 4/2000 | Grummer et al. |
| 6,052,707 A * | 4/2000 | D'Souza ..................... 709/106 |
| 6,055,533 A | 4/2000 | Hogge |
| 6,230,118 B1 * | 5/2001 | Bader et al. .................. 703/24 |
| 6,253,225 B1 * | 6/2001 | Nakahara et al. ........... 709/100 |
| 6,256,659 B1 * | 7/2001 | McLain, Jr. et al. ........ 709/100 |
| 6,295,518 B1 * | 9/2001 | McLain et al. ............... 703/23 |
| 6,587,894 B1 | 7/2003 | Stracovsky et al. |

OTHER PUBLICATIONS

Texas Instruments Alex Tessarolo, TMS320C27x—New Generation of Embedded Processor Looks Like a $\mu$C, Runs Like a DSP, White Paper: SPRA446; pp. 1–24, Mar. 1998.
Texas Instruments, TMS320C2x/C2xx/C5x—Optimizing C Compiler User's Guide; pp. i–Index 14, Aug. 1999.
Texas Instruments, Chapter 2, Central Processing Unit for Texas Instruments CPU architecture; origin www.TI.com; documents no longer available as of Apr. 16, 2001, unknown.
Texas Instruments, Chapter 6, Assembly Language Instructions for Texas Instruments 27xx Type Digitizing Signal Processors; origin www.TI.com; documents no longer available as of Apr. 16, 2001, unknown.

* cited by examiner

*Primary Examiner*—A. Elamin
(74) *Attorney, Agent, or Firm*—David K. Lucente; Derek J. Berger

(57) ABSTRACT

A data storage device control module for controlling operational processes in a data storage device comprises a number of preemptive modules, a number of non-preemptive modules, and a scheduler module operable to schedule the execution of the non-preemptive modules only in the data storage device control module. Preferably included as one of the non-preemptive modules is a queue processor module operable to manage the position and movement of command nodes in multiple command node queues.

21 Claims, 19 Drawing Sheets

MODULAR DISC DRIVE ARCHITECTURE

RELATED APPLICATIONS

This application claims priority of U.S. provisional application Serial No. 60/181,164, filed Feb. 9, 2000.

FIELD OF THE INVENTION

This application relates generally to disc drives and more particularly to a control architecture for an AT type disc drive interface controller.

BACKGROUND OF THE INVENTION

There has been a constant demand in the disc drive industry to produce disc drives having greater performance and higher capacity. In the highly competitive disc drive industry, this goal of increasing performance and capacity is made more difficult by the competitive requirement to do so while limiting or reducing the overall cost of the disc drive. Additionally, the highly competitive nature of the disc drive industry has led to ever increasing constraints on the time allowed to develop and bring a new disc drive to market. As demand for these low cost, high capacity, and high performance disc drives grows, and as the time to develop these disc drives is decreased, the pressure to create new and innovated solutions has been tremendous.

One recent approach in the disc drive industry to meet these demands has been centered on integrating many of the previously separate functions and/or components of the disc drive into fewer, or monolithic routines or components. One disadvantage to the approach is the increased complexity and cost of these components. Owing to the increased complexity of the components the cost of equipment to test, program, and support these components is often increased. Additionally, due to the constraints on the time allowed to incorporate and implement these components, the manner in which these components, and the disc drive architecture as a whole, have been incorporated has often been in a piece meal or ad hoc manner. For example, often the code or system software which controls the various operations of the disc drive is designed and written in a linear, non-modular manner without particular regard to possible future changes or upgrades. As such, it is often necessary to start anew, or rewrite the system software whenever new features or capabilities are desired.

An area where increased complexity in disc drive technology is evident is in the area of disc drive microprocessor technology. In particular, a recent trend in the disc drive industry has been to incorporate ever more complex microprocessors or controllers to carry out various functions in the disc drive. A number of problems are encountered when incorporating these more complex processors and controllers. One of the principle problems with employing these complex microprocessors and controllers is their increased cost over simpler microprocessors and controllers. Another problem with today'complex microprocessors and controllers is that they often contain features and capabilities which are not or may not be required or employed in a given disc drive. Another problem with the more complex microprocessors and controllers, particularly is the time required for those involved in the development of the disc drive to become familiar with their operation and implementation.

Another trend in the disc drive industry is to incorporate microprocessors which allow for multitasking. Multitasking provides a microprocessor the ability to seemingly work on a number of tasks simultaneously. This is accomplished by quickly switching from one task to another, thus giving the appearance that the microprocessor is executing all of the tasks at the same time. The process of switching from one task to another is often referred to as context switching. Context switching is commonly carried out in a disc drive microprocessor by a scheduler/dispatcher, which provides a mechanism for the acceptance of tasks into the system and for the allocation of time within the system to execute those tasks.

Multitasking can be either preemptive or cooperative. In cooperative multitasking the scheduler/dispatcher relies on each task to voluntarily relinquish control back to the scheduler so that another task may be run. In preemptive miultitasking the scheduler decides which task receives priority, and parcels out slices of microprocessor time to each tasks and/or to portions of each task. In either preemptive or cooperative multitasking, some or all of the tasks will may have their own "context." That is, each task may have its own priority, set of registers, stack area, program counter, timers, etc. These contexts are saved when a context switch occurs and/or when a system interrupt occurs. The tasks context is then restored when the task is resumed.

One disadvantage of multitasking is that it may introduce time delays into the system as the processor spends some of its time choosing the next task to run and saving and restoring contexts. However, multitasking typically reduces the worst-case time from task submission to task completion compared with a single task system where each task must finish before the next task starts. Additionally, multitasking saves processing time by allocating processor time to one task while another task is in a waiting state. If the disc drive microprocessor provides multitasking, the microprocessor will typically employ a scheduler/dispatcher to order and execute the tasks.

One solution to many of the above noted problems related to the increased complexity in disc drive architecture is to employ a digital signal processor (DSP) as the primary controller of the disc drive. DSP typically provide high computational speeds at a relatively low cost when compared to more complex microprocessors. Additionally, DSP are typically much less expensive than non-DSP type disc drive microprocessors. However, one significant problem with the use of DSPs is their traditionally inferior stack support and poor interrupt and context switch latency. As such, DSPs have not been favored in advanced disc drive device designs which employ multitasking, particular those which employ preemptive type multitasking.

Another trend in the industry is that towards asynchronous disc drive control systems. Typically, disc drive controllers must handle a number of asynchronous inputs, such as inputs from a host computer, inputs from the discs, and inputs from various service or interrupt systems within the disc drive. A common approach to dealing with these asynchronous inputs is to have control of these inputs handled asynchronously. While handling these asynchronous inputs in an orderly synchronous manner may be preferable to the asynchronous methods currently finding favor, disc drive designers have had great difficulty in designing synchronous systems which do not incur significant penalties in terms of speed.

It is with respect to these considerations and others that the present invention has been developed.

SUMMARY OF THE INVENTION

Against this backdrop the present invention has been developed. One aspect of the present invention involves a controller for a data storage device which includes a number of preemptive control modules, a number of non-preemptive control modules, and a scheduler module which is operative to control the execution of only the non-preemptive control modules. Preferably, the preemptive control modules handle timing critical operations, such as responses to interrupts from a host computer. The modularity of the disc drive controller provides for easy upgrading and debugging of the controller. Additionally, the non-preemptive modules reduce context switching time, which reduces latency in a data storage device which uses the controller.

Another aspect of the present relates to a data storage device having a data storage disc, an actuator assembly adjacent the disc including a read/write head, and a data storage device controller operably connected to the actuator assembly. The data storage device controller preferably includes a microprocessor, a computer readable medium, and number of non-preemptive operating modules. Each of the non-preemptive operating modules are preferably composed of microprocessor executable code operable to control a process within the data storage device controller. A scheduler for scheduling the order in which the microprocessor executes the non-preemptive operating modules is also preferably included. Finally, a number of preemptive operating modules, each of which is preferably composed of microprocessor executable code and each of which is capable of control a process within the data storage device controller are also included. The preemptive operating modules preferably preempt the operation of the scheduler and the cooperative operating modules in the data storage device.

These and various other features as well as advantages which characterize the present invention will be apparent from a reading of the following detailed description and a review of the associated drawings.

BRIEF DESCRIPTION OF THE DRAWINGS

FIGS. 7-1 and 7-2 illustrate yet another alternative operational flow of a computer program embodiment of the disc drive scheduler shown in FIG. 4.

DETAILED DESCRIPTION

Figure 1:
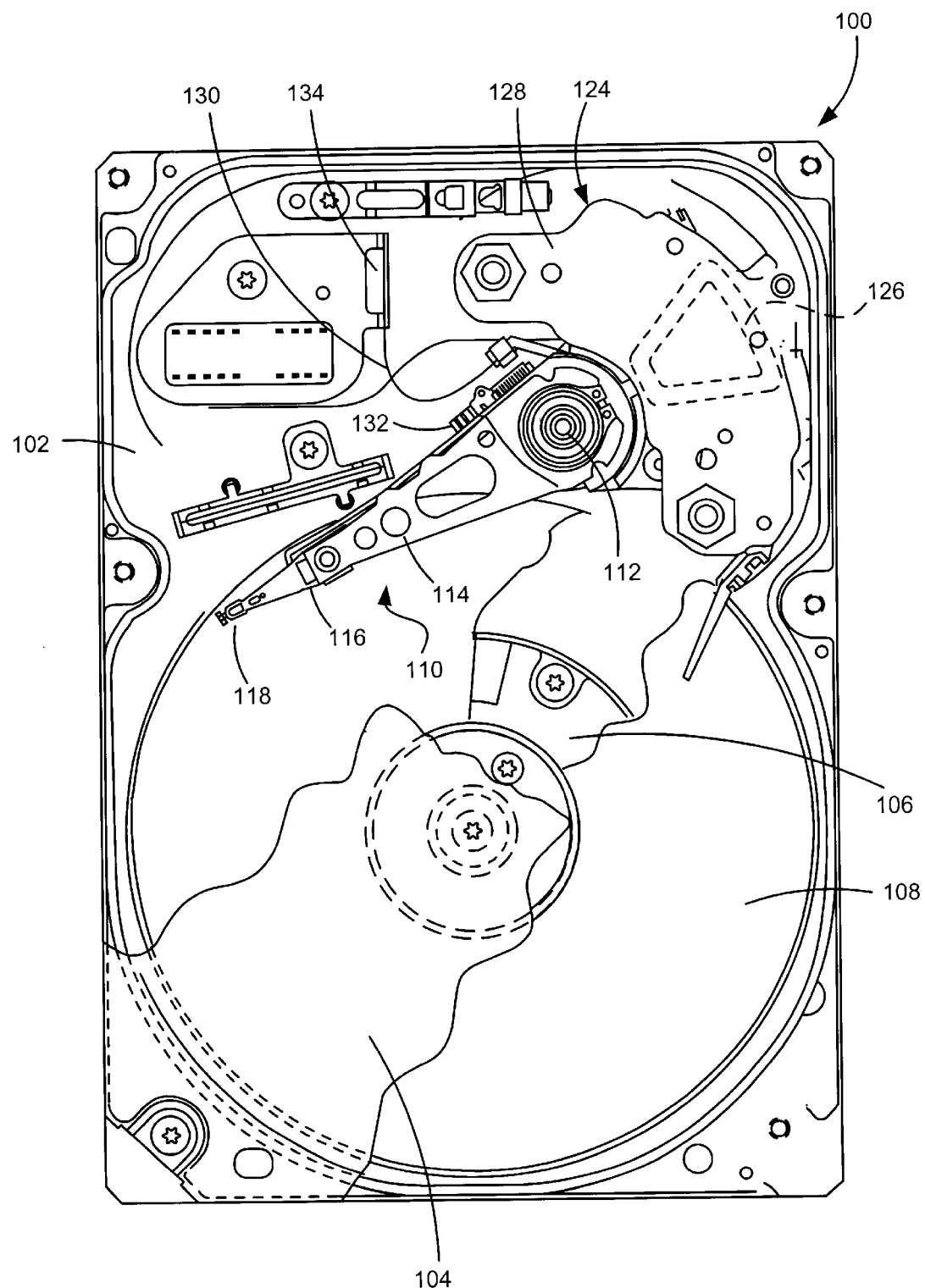
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110. One or more stationary permanent magnets 128 establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
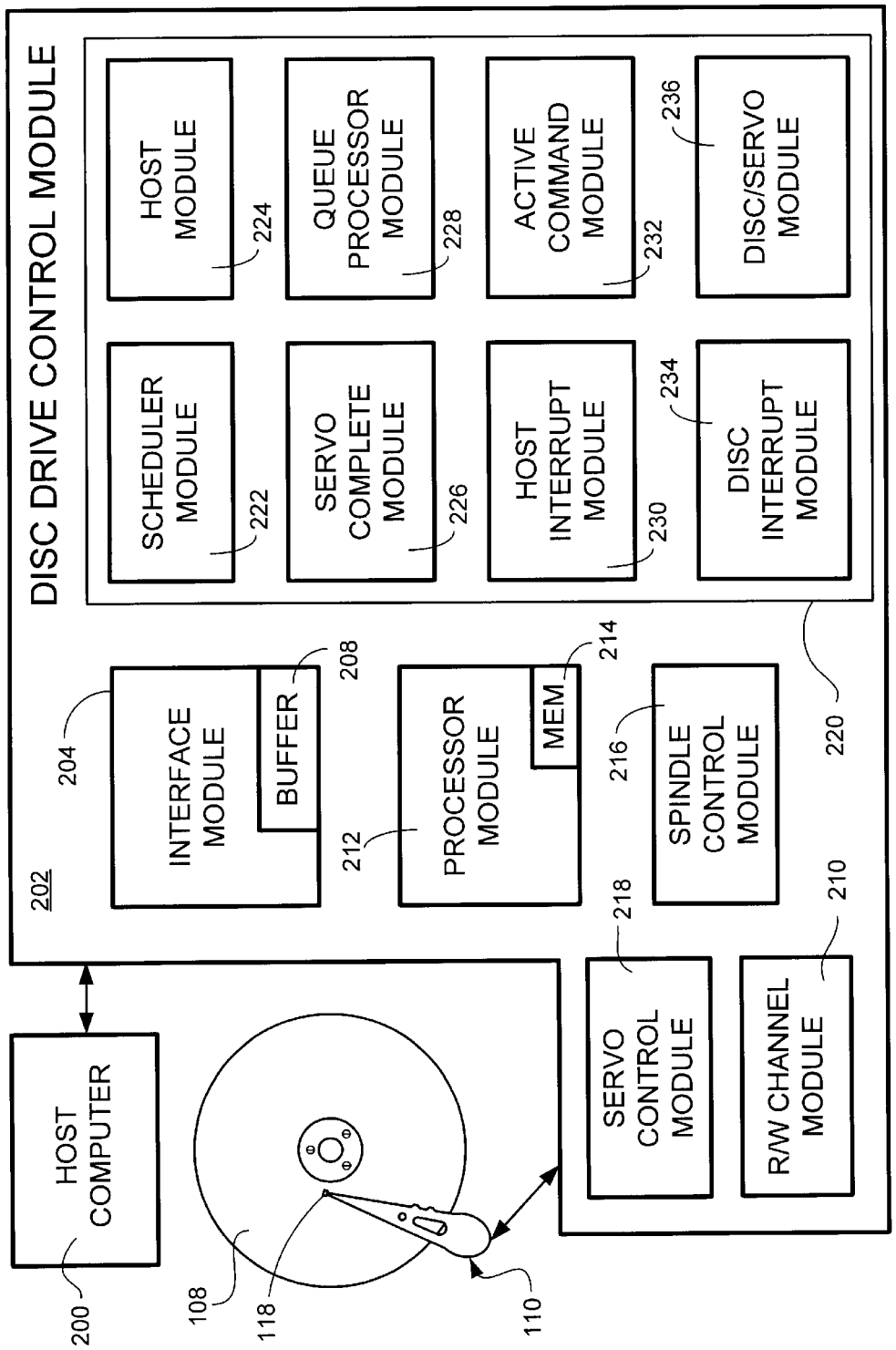
FIG. 2 is a simplified functional block diagram of the disc drive shown in FIG. 1 in accordance with a preferred embodiment of the present invention.

Referring now to FIG. 2, shown therein is a functional block diagram of the disc drive 100 of FIG. 1, generally showing the main functional modules which control the operation of the disc drive 100. As shown in FIG. 2, a host computer 200 is preferably operably connected to a disc drive control module 202, such that data as well as control and interrupt commands may be received by the control module 202 from the host computer 200. As also shown in FIG. 2, the control module 202 is additionally operably connected to the actuator assembly 110, so that servo control information may be transferred from the control module 202 to the actuator assembly 110 to control the position of the heads 118 relative to the discs 108, and such that data may be transferred between the control module 202 and the discs 108 of the disc drive 100, via the heads 118.

The control module 202 comprises a number of functional modules which control the operation of the disc drive 100. The logical operations of the various functional modules of the disc drive 100 may be implemented (1) as a sequence of processor implemented acts or program modules running on a processor and/or (2) as interconnected machine logic circuits or circuit modules within the disc drive 100. The implementation is a matter of choice dependent on the performance requirements of the disc drive 100. Accordingly, the logical operations of the various modules of the disc drive 100 described herein are referred to variously as operations, structural devices, acts or modules. While a number of the following modules of the disc drive 100 are discussed as being implemented either as hardware or as software, it will be recognized by one skilled in the art that these operations, structural devices, acts and modules may be implemented in hardware, in software, in firmware, in special purpose digital logic, or in any combination thereof without deviating from the spirit and scope of the present invention as recited within the claims attached hereto.

The control module 202 includes an interface module 204. The interface module 204 typically includes an associated buffer 208 which facilitates high speed data transfer between the host computer 200 and the disc drive 100. Data to be written to the disc drive 100 are passed from the host computer to the interface module 206 and then to a read/write channel module 210, which encodes and serializes the data and provides the requisite write current signals to the heads 118. To retrieve data that has been previously stored by the disc drive 100, read signals are generated by the heads 118 and provided to the read/write channel module 210, which performs decoding and error detection and correction operations and outputs the retrieved data to the interface 206 for subsequent transfer to the host computer 100. Such operations of the disc drive 200 are well known in the art and are discussed, for example, in U.S. Pat. No. 5,276,662 issued Jan. 4, 1994 to Shaver et al.

As also shown in FIG. 2, the control module 202 includes a processor module 212. The processor module 212 provides top level communication and control for the disc drive 100 in conjunction with programming for the processor module 212 which is typically stored n a processor module memory (MEM) 214. The MEM 214 can include random access memory (RAM), ready only memory (ROM) and other sources of resident memory for the processor module 212. Additionally, the processor module 212 provides control signals for the-spindle control module 216, and the servo control module 218.

Also present in the control module 202 of the disc drive 100 is a disc drive command module 220. The disc drive command module 220 (command module) is operable for controlling a number of the operations of the disc drive 100. As shown in FIG. 2, the command module 220 includes: a scheduler module 222; a host module 224; a servo complete module 226; a queue processor module 228; a host interrupt module 230; an active command module 232; a disc interrupt module 234; and a disc/servo module 236. Preferably, the modules included in the command module will be implemented as executable program code operable for running on and controlling the processor module 212, as will now be described.

Scheduler Module

Figure 3:
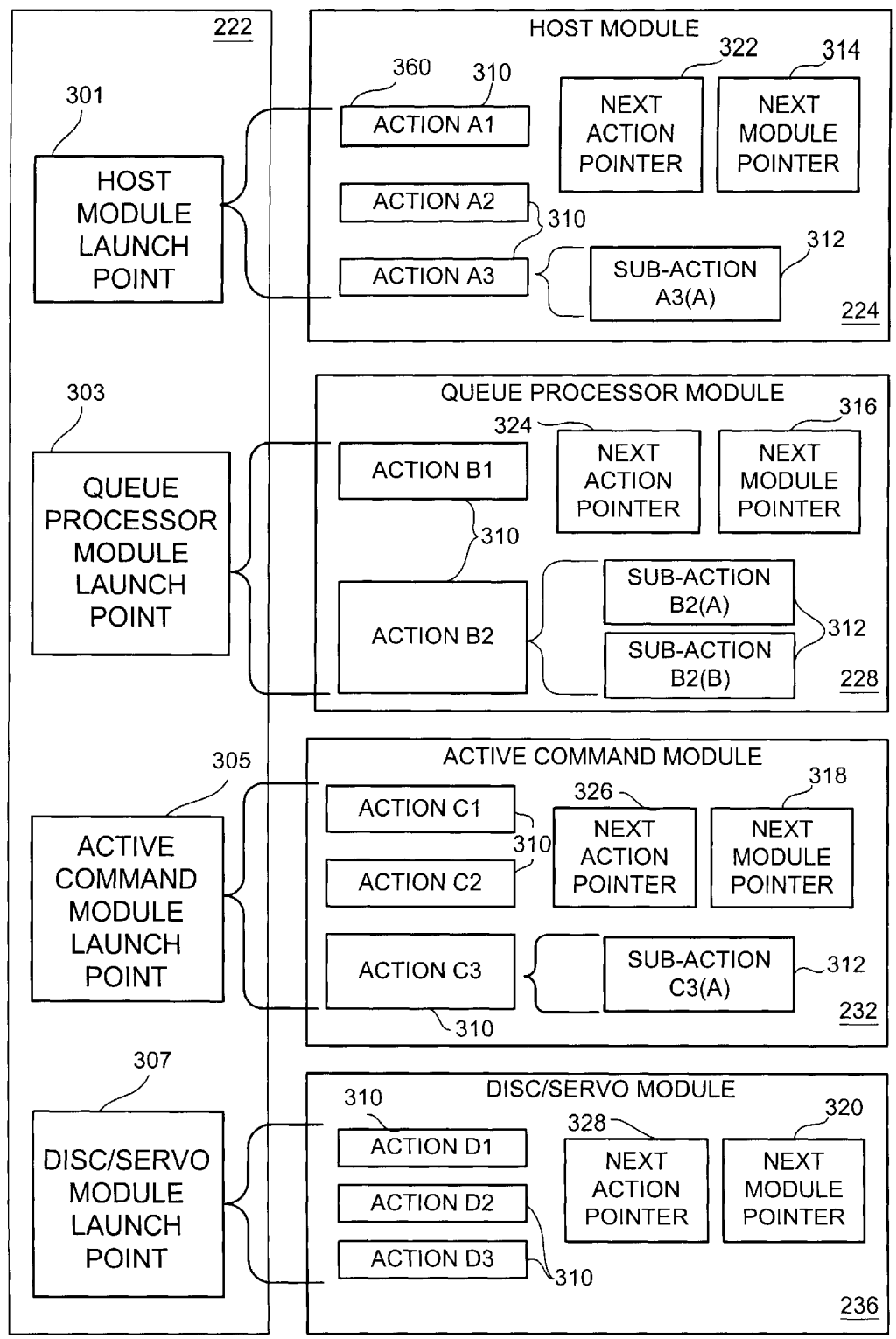
FIG. 3 illustrates an operational flow of a disc drive scheduler according to an example embodiment of the present invention.

Central to the operation of the command module 220, and thus the disc drive, is the scheduler module 222, as shown in FIG. 3. The scheduler module 222 is employed in the disc drive 100 to schedule and dispatch the various modules of the command module 220 for processing by the processor module 212. For example, preferably the scheduler module 222, will schedule and dispatch the host module 224, the queue processor module 228; the active command module 232; and the disc/servo module 236. The scheduler module 222 may include number of module launch points and associated modules However, in a preferred embodiment of the present invention the scheduler module 222 includes four module launch points 301, 303, 305, and 307, each of which corresponds to an associated module: the host module 224, the queue processor module 228, the active command module 232, and the disc/servo module 236, respectively. It is to be understood that the scheduler module 222 may include more or fewer than the four module launch points and the four associated modules shown and discussed with respect to FIGS. 3. Additionally, as described in greater detail below, the scheduler module 222 is operable to add and remove modules dynamically.

To provide a better understanding of the function of the scheduler module 222, a brief, general description of the modules which interact with the scheduler module 222 will now be given.

The host module 224 preferably handles all non-timing critical, host related functions, such as cache hit searches for reads of the discs of the disc drive and cache collision detection for writes to the discs of the disc drive. Additionally, the host module 224 may provide write commands to the queue processor module 228 and handle host resets for delayed writes to the discs. The host module 224 may also prepare the queue process module 228 for writes and the disc-servo module 236 for reads.

The queue processor module 228 manages a number of queues which are used for the entry, sorting, and dispatching of commands in the control module 202. The active command module 232 handles the data management of the control module 202. That is, the flow of data into and out of, for example, buffer memory 208 of the control module 202. The disc/servo module 236 handles all media access. The disc servo module 236 initializes and starts a disc formatter for performing the low level, time critical reading and writing of the discs 108 and a media manager for maintaining the read/write heads 118 of the disc drive 100 in proper circumferential orientation on the disc relative to an index mark on the discs 108. Additionally, the disc servo module 236 launches the disk interrupt module 234 and the servo complete module 226, both of which are described in more detail below. The disc servo module 236 recovers from media errors and servo errors by changing parameters in the logic which decodes data on the discs. Finally, the disc servo module 236 serves to reissue failed seek commands and spins up the disc drive when it has spun down.

In a preferred embodiment of the present invention the host module 224, the queue processor module 228, the active command module 232, and the disc/servo module 236 are all cooperative and cannot be preempted by another module scheduled by the scheduler 222. As such, no modules scheduled by the scheduler 222 require context saves when being implemented by the scheduler 222, thus reducing the switching time between one module and another and allowing quicker response time to time critical events then would occur if the modules were preemptive.

FIG. 3 illustrates some of the basic elements and operational parameters of the scheduler module 222 in accordance with an embodiment of the present invention. As shown in FIG. 3, the scheduler module 222 includes a plurality of module launch points 301, 303, 305, and 307. As also shown in FIG. 3, each of the module launch points 301, 303, 305, and 307 has an associated module: host module 224, queue processor module 228, active command module 232, and disc/servo module 236, respectively. While the scheduler module 222 of FIG. 3 is shown having four module launch points 301, 303, 305, and 307, each of which having an associated module 224, 228, 232, and 236, respectively, it is to be understood that the scheduler module 222 may include any number of launch points and associated modules.

As shown in FIG. 3, each module 224, 228, 232, and 236 comprises one or more associated actions 310. Each individual module 224, 228, 232, and 236 may include only actions 310 which are exclusive to that module. Additionally, although not specifically shown in FIG. 3, individual modules 224, 228, 232, and 236 may share one or more actions 310. As used herein the term action describes an event or a series of events or commands which may be executed by scheduler module 222. Preferably, actions are logical steps or executable code.

As also shown in FIG. 3, each action 310 may include one or more associated sub-actions 312. Each individual action 310 may include only sub-actions 312 which are exclusive to that action 310 or individual actions 310 may share one or more sub-actions 312. Any of the actions 310 within a module 224, 228, 232, and 236 may be executed by the host module launch point 301, 303, 305, or 307 associated with that module. Additionally, any action 310 may possibly execute any other action 310 within its module 224, 228, 232, and 236. Finally, any action may execute any associated sub-action 312.

Each of the modules 224, 228, 232, and 236 of the scheduler module 222 has an associated next module indicator 314, 316, 318, and 320, respectively. Each next module indicator 314, 316, 318, and 320 indicates the next module which is to be implemented upon completion of the module to which the next module indicator is associated. Additionally, each of the modules 224, 228, 232, and 236 includes a next action indicator 322, 324, 326, and 328, respectively. Each of the next action indicator 322, 324, 326, and 328 indicates which of the actions 310 in the module to which the next action indicator is associated is to be executed when the associated module is launched.

The next module indicators 314, 316, 318, and 320 and the next action indicators 322, 324, 326, and 328, may be dynamically modified by actions 310 during the execution of the actions 310. Any action 310 may modify any next action indicator 322, 324, 326, and 328, including the next action indicator associated with the module to which the action is associated. Any action 310 may also modify any next module indicator 314, 316, 218, and 320, including the next module indicator associated with the module to which the action is associated. In this way, the order of launch of the modules 302, 304, 306, and 308 and the order of execution of the actions 310, may be dynamically modified during operation of the scheduler module 222, thus allowing a great deal of flexibility in managing the operational flow of the scheduler module 222. Additionally, any or all of the next module indicators 314, 316, 318, and 320 and/or the next action indicators 322, 324, 326, and 328, may be set and remained fixed throughout the operation of the scheduler module 222.

The operational flow from one module launch point 301, 303, 305, or 307 to another module launch point may occur in one of two ways, either directly from one module launch point 301, 303, 305, or 307 to another module launch point, or from one module launch point to another module launch point via an action 310. A better understanding of the manner in which the operational flow of the scheduler module 222 may be controlled may be had with reference to the following example.

Figure 4:
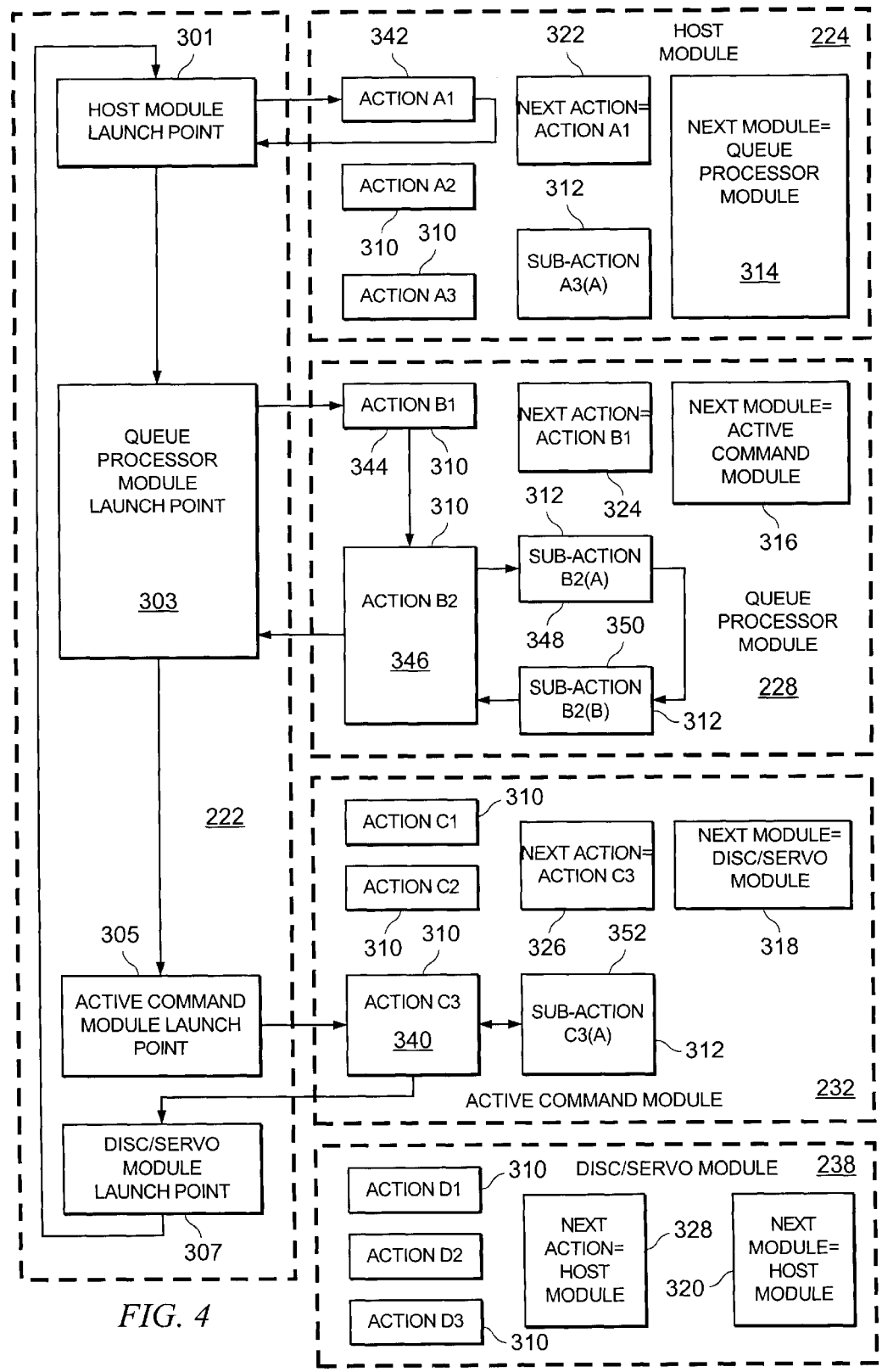
FIG. 4 illustrates an operational flow of a disc drive scheduler according to an example embodiment of the present invention.

FIG. 4 illustrates one example of a possible operational flow of the scheduler module 222. As shown, the next module indicator 314 associated with host module 224 is set to queue processor module 228, the next module indicator 316 associated with queue processor module 228 is set to the active command module 232, the next module indicator 318 associated with the active command module 232 is set to the disc/servo module 236, and the next module indicator 320 associated with the disc/servo module 236 is set to the host module 224. As also shown in FIG. 4, the next action indicator 322 associated with the host module 224 is set to action A1 342, the next action indicator 324 associated with the queue processor module 228 is set to action B1 344, the next action indicator 326 associated with the active command module 232 is set to action C3 340, and the next action indicator 328 associated with the disc/servo module 236 is set to host module 224.

In this example, the host module launch point 301 implements action A1 342 of the host module 224. This occurs because the next action indicator 322 associated with the host module 224 indicates action A1 342 as the action to be executed upon launch of the host module 224 by the scheduler module 222. At the end of the execution of action A1 342, the operational flow of the scheduler module 222 is directed back to the host module launch point 301 by action A1 342. This occurs because action A1 342 includes a command or direction (not shown) directing the operational flow of the scheduler module 222 back to the host module launch point 301.

In this example, the host module launch point 301 implements action A1 342 of the host module 224. This occurs because the next action indicator 322 associated with the host module 224 indicates action A1 342 as the action to be executed upon launch of the host module 224 by the scheduler module 222. At the end of the execution of action A1 342, the operational flow of the scheduler module 222 is directed back to the host module launch point 301 by action A1 342. This occurs because action A1 342 includes a command or direction (not shown) directing the operational flow of the scheduler module 222 back to the host module launch point 301.

The operational flow of the scheduler module 222 then flows from the host module launch point 301 to the queue processor module launch point 303. This occurs because the next module indicator 314 associated with the host module 224 indicates the queue processor module 228 as the module to be implemented after the completion of the host module 224. The queue processor module launch point 303 then executes action B1 344 of the queue processor module 228, which in turn executes action B2 346. The launch point 303 executes action B1 344 because the next action indicator 324 associated with the queue processor module 228 indicates action B1 344 as the action to be executed upon the launch of the queue processor module 228 by the scheduler module 222. Action B1 344 executes action B2 346 due to a command or direction within action B2 346 requiring the execution of action B2 346 at the completion of action B1 344. Action B2 346 then executes sub-action B2(*a*) 348 and sub-action B2(*a*) 350 in order as a part of the operation of action B2 346. At the conclusion of the execution of sub-actions B2(*a*) and B2(*b*), action B2 346 directs the operational flow of the scheduler module 222 back to the queue processor module launch point 228 from action B2 346. This occurs because action B2 346 includes a command (not shown) directing the operational flow of the scheduler module 222 back to the queue processor module launch point 303.

The operational flow of the scheduler 222 then flows from the queue processor module launch point 303 to active command module launch point 305. This occurs because the next module indicator 316 associated with the queue processor module 228 indicates the active command module 232 as the module to be implemented after the completion of the queue processor module 228. The active command module launch point 305 then executes action C3 340. This occurs because the next action indicator 326 associated with the active command module 232 indicates action C3 340 as the action to be executed upon launch of the active command module 232 by scheduler 222. Action C3 340 then performs sub-action C3(*a*) 352 as a part of the operation of action C3 340.

At the conclusion of sub-action C3(*a*) 352, action C3 340 directs the operational flow of the scheduler module 222 to the disc/servo module launch point 307. This occurs because action C3 340 includes a command or direction which directs the operational flow of the scheduler module 222 to the module indicated by next module indicator 318 of the active command module 232. In this way, the operational flow of the scheduler module 222 may flow directly from an action to a module without returning to the module launch point which launched the action. Finally, the operational flow of the scheduler module 222 proceeds directly from the disc/servo module launch point 307 to the host module launch point 301. This occurs because the next action indicator 328 associated with disc/servo module 236 indicates the host module 224 as the module to be executed after the completion of the disc/servo module 236, in effect bypassing the action 310 of the disc/servo module 236.

It is to be understood that the above example of an operational flow of the scheduler module 222 is but one example of a possible operational flow of the scheduler module 222. Any number of possible operational flows may occur which are consistent with the basic operational parameters of the scheduler module 222 as laid out above.

The following examples of the operational flow of the scheduler module 222 address more particularly the scheduler module as implemented as operation code for the processor module 212. As shown in FIG. 3, each of the modules 224, 228, 232, and 236 preferably has an associated next module pointer 314, 316, 318, and 320, respectively. These next module pointers indicate, or point to the starting address of the next module 224, 228, 232, or 236 which is to be launched upon completion of the module to which the next module pointer is associated. Additionally, each module 224, 228, 232, and 236 of the scheduler module 222 has an associated next action pointer 322, 324, 326, and 328, respectively. The next action pointers indicate, or point to the starting address of the action which is to be executed upon entry into the module to which the next action pointer is associated. Each module 224, 228, 232, and 236 in the scheduler 222 preferably defines and keeps its own local variables. Preferably, there are no global variables in the scheduler 222. In this way, greater efficiency is achieved in the scheduler 222, as processor time and resources are not spent saving contexts. Allocation of memory space for the next module pointers 314, 316, 318, and 320 and the next action pointers 322, 324, 326, and 328, and the various local variables of the actions 310, preferably occurs at the compile time of scheduler module 222. Various methods of program compilation and memory allocation are well known in the art. The method used to allocate memory with respect to scheduler module 222 is dependent upon the type of processor in which scheduler module 222 is implemented.

As shown in FIG. 3, each module 224, 228, 232, and 236 preferably comprises one or more associated actions 310, which may be executed upon launch of a module 224, 228, 232, or 236 by the scheduler 222. Additionally, each of the actions 310 may execute one or more sub-actions 312. It is to be understood that the scheduler module 222 may include or execute more or fewer sub-module than the sub-modules shown in FIG. 3, depending on the requirements of a particular disc drive 100.

In addition to the cooperative modules implemented by the scheduler 222, the control module 202 may implement preemptive routines which interact with the modules of the scheduler module 222. For example, the control module 202 preferably includes a host interrupt module 230, a disc interrupt module 234, and a servo complete module 226. These preemptive modules may interact with, be called by, and/or call one or more of the four modules 224, 228, 232, and 236 launched and executed by the scheduler module 222. The host interrupt module 230 preferably performs the function of determining if commands coming into the disc drive 100 are candidates for queuing, and, if so, sets the next action pointer 318 within the host module 224 such that the incoming command is executed the next time the host module 224 is called. The host interrupt module 230 preferably determines if a reset command is pending and, if so, launches the appropriate action in host module 224.

The disc interrupt module 234 preferably determines when the disc formatter has stopped and calculates how many data blocks have been written or read and if any errors occurred in reading or writing the data blocks. The servo complete module 226 starts a disc drive formatter on the first possible servo frame after a servo interrupt has completed.

Operation of an embodiment of the scheduler module 222 occurs as follows. At the start up of the disc drive a boot/initialization process is preferably utilized to prepare the disc drive for operation and to initialize the scheduler module 222. At the initialization of the scheduler module 222, the next module pointer 314 associated with the host module 224 is set to the address of the queue processor module launch point 303, the next module pointer 316 associated with the queue processor module 228 is set to the address of the active command module launch point 305, the next module pointer 318 is associated with the active command module 224 is set to the address of the disc/servo module launch point 307, and the next module pointer 320 associated with the disc servo module 224 is set to the address of the host module launch point 301.

Additionally, the next action pointer 322 associated with host module 224 is set to the address of the queue processor module launch point 303, the module next action pointer 324 associated with queue processor module 228 is set to the address of the active command module launch point 305, the active command module next action pointer 326 is set to the address of the disk/servo module launch point 307, and the disk/servo module next action pointer 328 is set to the address of the host module launch point 301. In this way, the scheduler module 222 is initially set in an idle state wherein no actions are being executed and the operational flow of the scheduler module 222 is operating in a loop moving from the host module launch point 301, to the queue processor module launch point 303, to the active command module launch point 305, to the disc servo module launch point 307, then back to the host module launch point 301, and so on in a circular manner. When a read or a write command is received by interface module 204 (FIG. 2), and acted on by the processor module 212, thus initializing the host interrupt routine 230. The host interrupt routine 230 then prepares the host module 224 for reception of a command from the interface 230 by setting the next action pointer 322 associated with the host module 224 to the appropriate action for the command which is to be received. When the host module 224 is next launched by the host module launch point 301, the action at the address specified by the next action pointer 322 associated with the host module is then executed. The action which is being executed may then modify the next action pointers 322, 324, 326, and/or 328 associated with the various module 224, 228, 232, and 236, such that execution of the command received from the interface 204 is carried out by the scheduler module 222.

For example, when a host module action, such as action A1 360 (FIG. 3), is being executed, the action may modify the next action pointer 324 associated with the queue processor module 228 so that a particular action is executed by the queue processor module launch point 303. Additionally, the executed host module action A1 360 may modify the next action pointers 322, 324, 326, and/or 328 associated with modules 224, 228, 232, and 236, including its own next action pointer 322, so that execution of the command received from the interface module 204 is carried out by the scheduler 222.

As each of the other modules 228, 232, and 236 are launched by their respective module launch points within the scheduler 222, they may modify the next action pointers 322, 324, 326, and/or 328 associated with any of the modules 224, 228, 232, and 236, including the next action pointer associated with their own module, so that execution of the command received from the interface module 204 is carried out by the scheduler 222.

Figure 5:
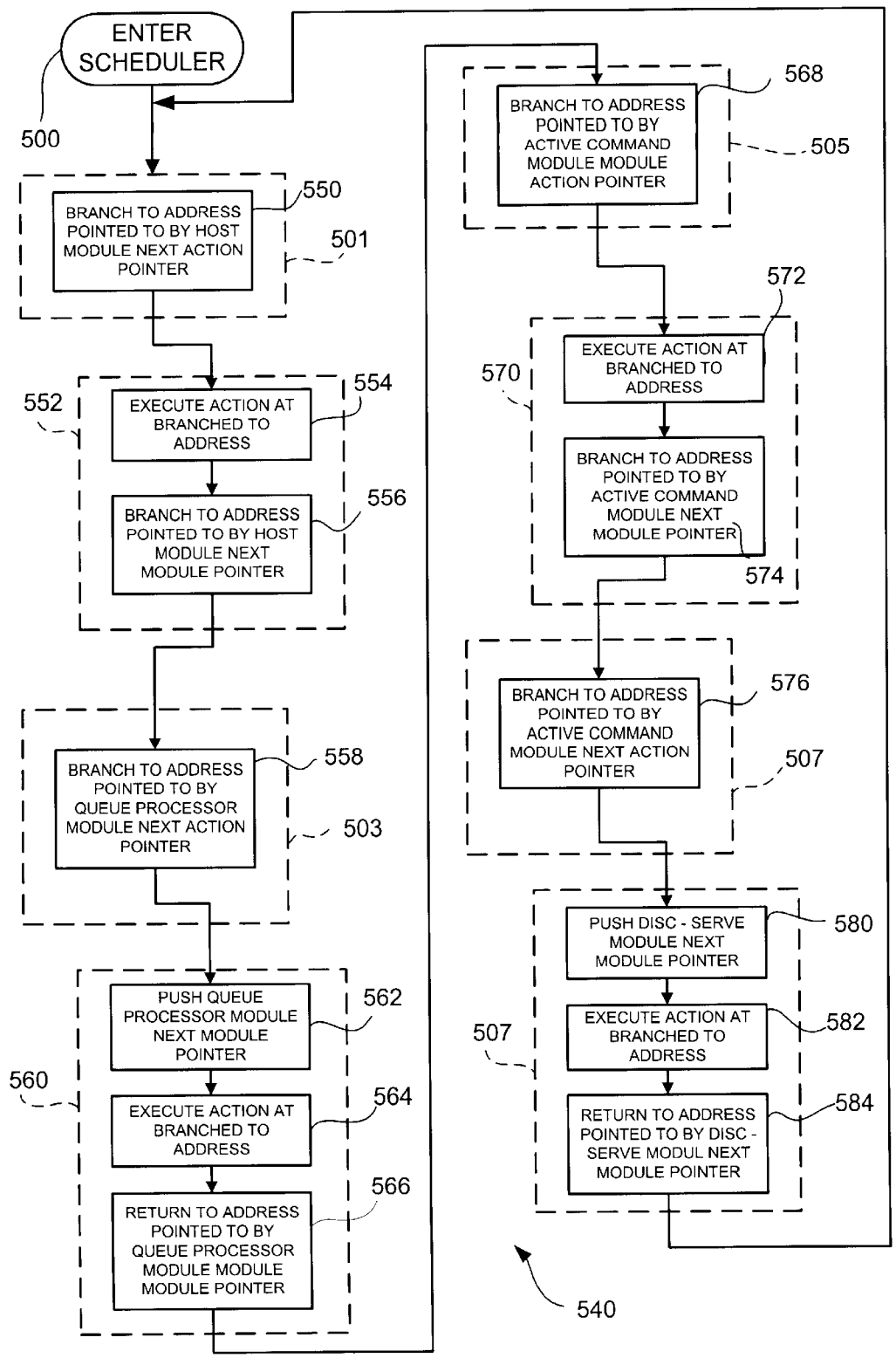
FIG. 5 illustrates an operational flow of a computer program embodiment of the disc drive scheduler shown in FIG. 4.

In a first embodiment of the scheduler module 222, the scheduler comprises a computer program or routine which is functional to operate on the computing processor module 212. FIG. 5 shows an example of a logical flow 540 of a computer program embodiment of the scheduler module 222. In this embodiment of scheduler 222, the module launch points 501, 503, 505, 507 are preferably written in the assemble language of the processor module 212. By writing the program code of the module launch points in assembly language, rather than a high level language such as the C programming language, a number of significant advantages are achieved. First, program code written in assembly language will typically run faster on a processor than program code written in a high level language such as C. Second, by writing the code of the module launch points in assembly, a branch instruction rather than a call instruction may used to initiate the various actions of the modules. By using the branch instruction rather than a call instruction, the execution flow of the scheduler module 222 may move directly from an action to a module launch point, without the need to return to the module launch point from which the action was initiated. This allows for dynamic rearranging, or skipping, of the modules by the scheduler.

For the purposes of the example shown in FIG. 5, entry 500 into the scheduler module 222 is shown occurring at the host module launch point 501. Upon entry into the host module launch point 501, a branch operation 550 branches to the address pointed to by the next action pointer 322 associated with the host module 224. In this way the host module launch point 501 "selects" the action 552 of the host module 224 which is to be executed. An execution operation 554 then executes the code of the action located at the addressed branched to by the branch operation 550. The branch operation 556 then branches to the address pointed to by the next module pointer 314 associated with the host module 224. Here, the address branched to by the branch operation 556 is the address of the queue processor module launch point 503.

Upon entry into the queue processor module launch point 503, a branch operation 558 branches to the address pointed to by the next action pointer 324 associated with the queue processor module 228. In this way the queue processor module launch point 501 "selects" the action 560 of the queue processor module 228 which is to be executed. A push operation 562 then pushes the next module pointer associated with the queue processor module 228. An execute operation 564 then executes the code of the action located at the addressed branch to by the branch operation 558. A return operation 566 then returns to the address pointed to by the next module pointer 316 associated with the queue processor module 228. Here, the address returned to by the return operation 566 is the address of the active command module launch point 505.

Upon entry into the active command module launch point 505, a branch operation 568 branches to the address pointed to by the next action pointer 326 associated with the active command module 232. In this way the active command module launch point 505 "selects" the action 570 of the active command module 232 which is to be executed. An execution operation 572 then executes the code of the action located at the addressed branch to by the branch operation 568. The branch operation 574 then branches to the address pointed to by the active command module next module pointer 318. Here, the address branched to by the branch operation 574 is the address of the disc/servo module launch point 507.

Upon entry into the disc/servo module launch point 507, a branch operation 576 branches to the address pointed to by the next action pointer 328 associated with the disc/servo module 236. In this way, the disc/servo module launch point 507 "selects" the action 507 of the disc/servo module which is to be executed. A push operation 580 then pushes the disc/servo module next module pointer 320. An execute operation 582 then executes the code of the action located at the addressed branch to by the branch operation 576. A return operation 584 then returns to the address pointed to by the disc/servo module next module pointer 320. Here, the address returned to by the return operation 584 is the address of the host module launch point 501. The operational flow of the scheduler 222 may continue on in the circular manner shown in FIG. 5.

Figure 6:
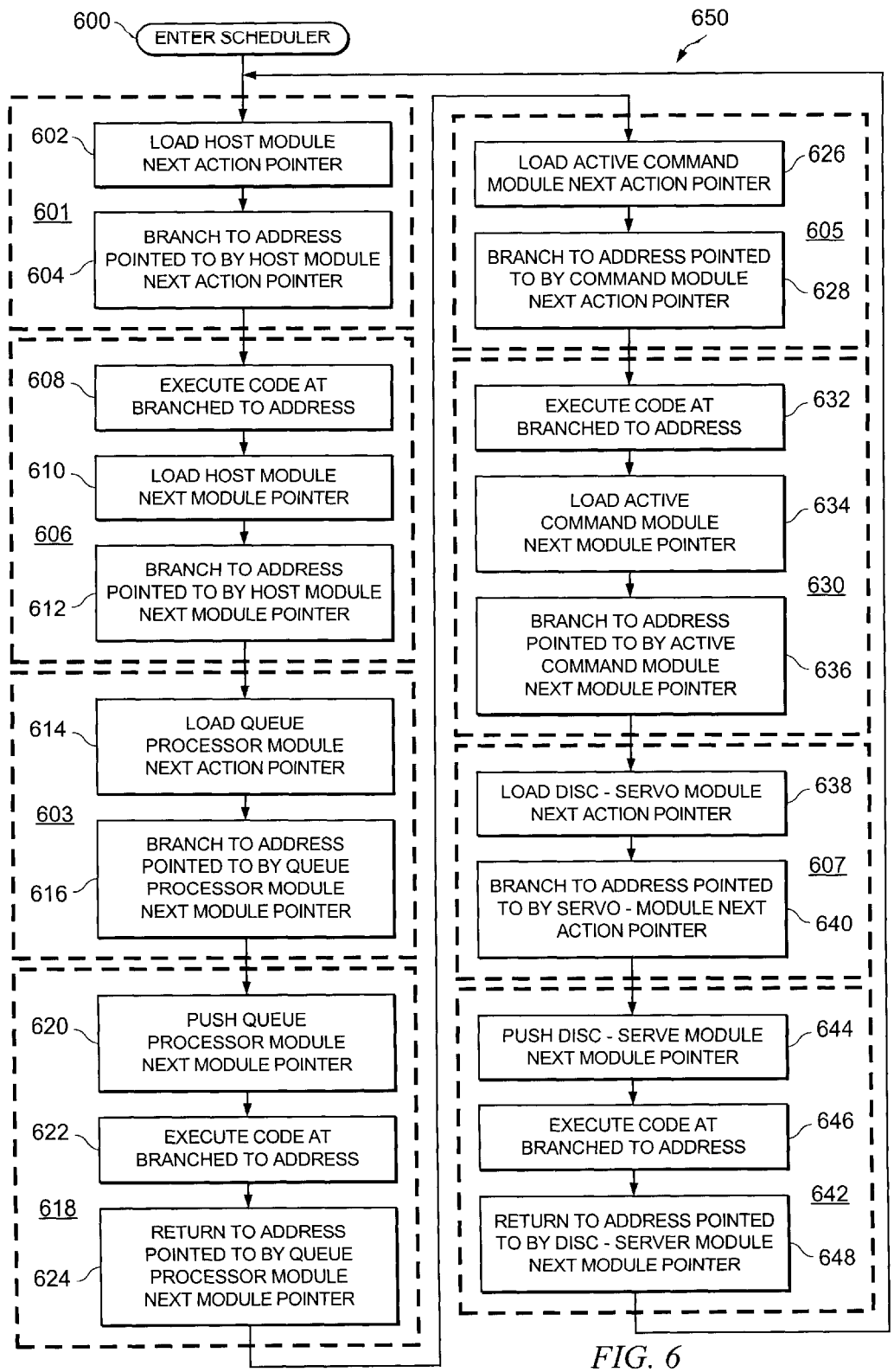
FIG. 6 illustrates an alternative operational flow of a computer program embodiment of the disc drive scheduler shown in FIG. 4.

In a second embodiment of the logical flow 650 of the scheduler module 222 is shown in FIG. 6. The second embodiment of the scheduler module 222 shown in FIG. 6 comprises a computer program or routine which is functional to operate on the processor module 212, wherein the processor module 212 is a general or special purpose processor which utilizes a memory based last-in-first-out (LIFO) stack. Similarly to the first embodiment of the scheduler module 222 shown in FIG. 6 includes module launch points 601, 603, 605, and 607, which are written in assembly language and actions and sub-actions which may be written in either assembly language or in a higher level programming language, such as C.

FIG. 6 shows an example of a logical flow 650 of a computer program embodiment of the disc drive scheduler utilizing a memory based last-in-first-out (LIFO) stack. For the purposes of the example shown in FIG. 6, entry 600 into the scheduler module 222 is shown occurring at the host module launch point 601. Upon entry into the host module launch point 601, a load operation 602 loads the next action pointer 322 associated with the host module 224. A branch operation 604 then branches to the address pointed to by the next action pointer 322 associated with the host module 224. In this way, the host module launch point 601 "selects" the action 606 of the host module 224 which is to be executed. An execution operation 608 then executes the code of the action located at the addressed branched to by the branch operation 604. A load operation 610 then loads the next module pointer 314 associated with the host module 224. A branch operation 612 then branches to the address pointed to by the next module pointer 314 associated with the host module 224. Here, the address branched to by the branch operation 612 is the address of the queue processor module launch point 603.

Upon entry into the queue processor module launch point 603, a load operation 614 loads the next action pointer 324 associated with the queue processor module 228. A branch operation 616 then branches to the address pointed to by the next action pointer 324 associated with the queue processor module 228. In this way, the queue processor module launch point 603 "selects" the action 618 of the queue processor module 228 which is to be executed. Push operation 620 then pushes the next module pointer 316 associated with the queue processor module 228. An execute operation 622 then executes the code of the action located at the addressed branch to by branch operation 616. A return operation 624 then returns to the address pointed to by the next module pointer 316 associated with the queue processor module 228. Here, the address returned to by return operation 624 is the address of the active command module launch point 605.

Upon entry into the active command module launch point 605, a load operation 626 loads the next action pointer 326 associated with the active command module 232. A branch operation 628 then branches to the address pointed to by the next action pointer 326 associated with the active command module 232. In this way, the active command module launch point 605 "selects" the action 630 of the active command module 232 which is to be executed. An execution operation 632 then executes the code of the action located at the addressed branch to by branch operation 628. A load operation 634 then loads the next module pointer 318 associated with the active command module 232. A branch operation 636 then branches to the address pointed to by the next module pointer 318 associated with the active command module 232. Here, the address branched to by the branch operation 636 is the address of the disc/servo module launch point 607.

Upon entry into disc/servo module launch point 607, a load operation 638 loads the next action pointer 328 associated with the disc/servo module 236. A branch operation 640 then branches to the address pointed to by the next action pointer 328 associated with the disc/servo module 236. In this way the disc/servo module launch point 607 "selects" the action 642 of the disc/servo module 236 which is to be executed. A push operation 644 then pushes the next module pointer 320 associated with the disc/servo module 236. An execute operation 646 then executes the code of the action located at the addressed branch to by branch operation 640. A return operation 648 then returns to the address pointed to by the next module pointer 320 associated with the disc/servo module 236. Here, the address returned to by return operation 648 is the address of the host module launch point 601. The operational flow of the scheduler 222 may continue on in the circular manner shown in FIG. 6.

Figures 1, 7:
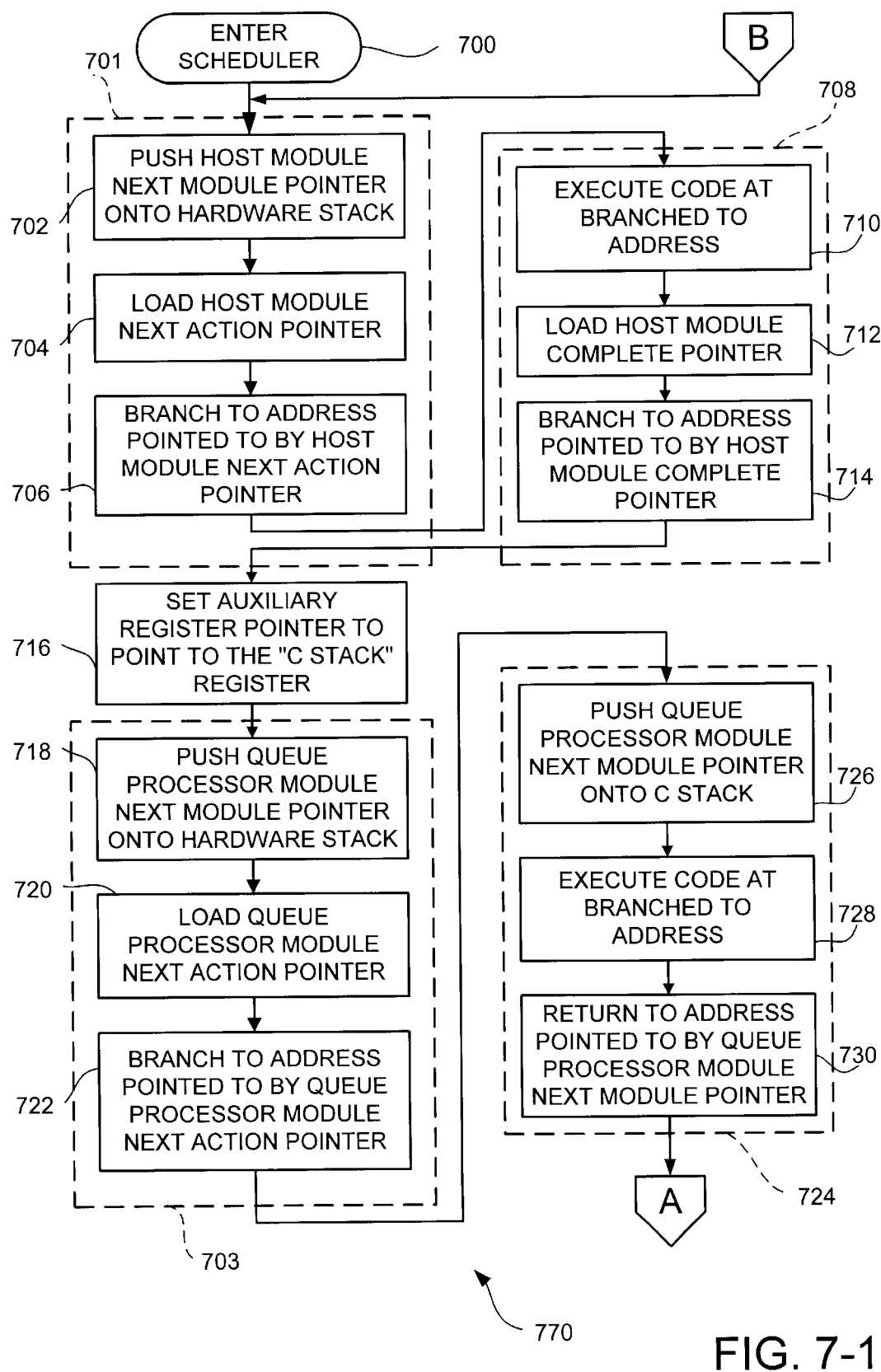
Figures 2, 7:
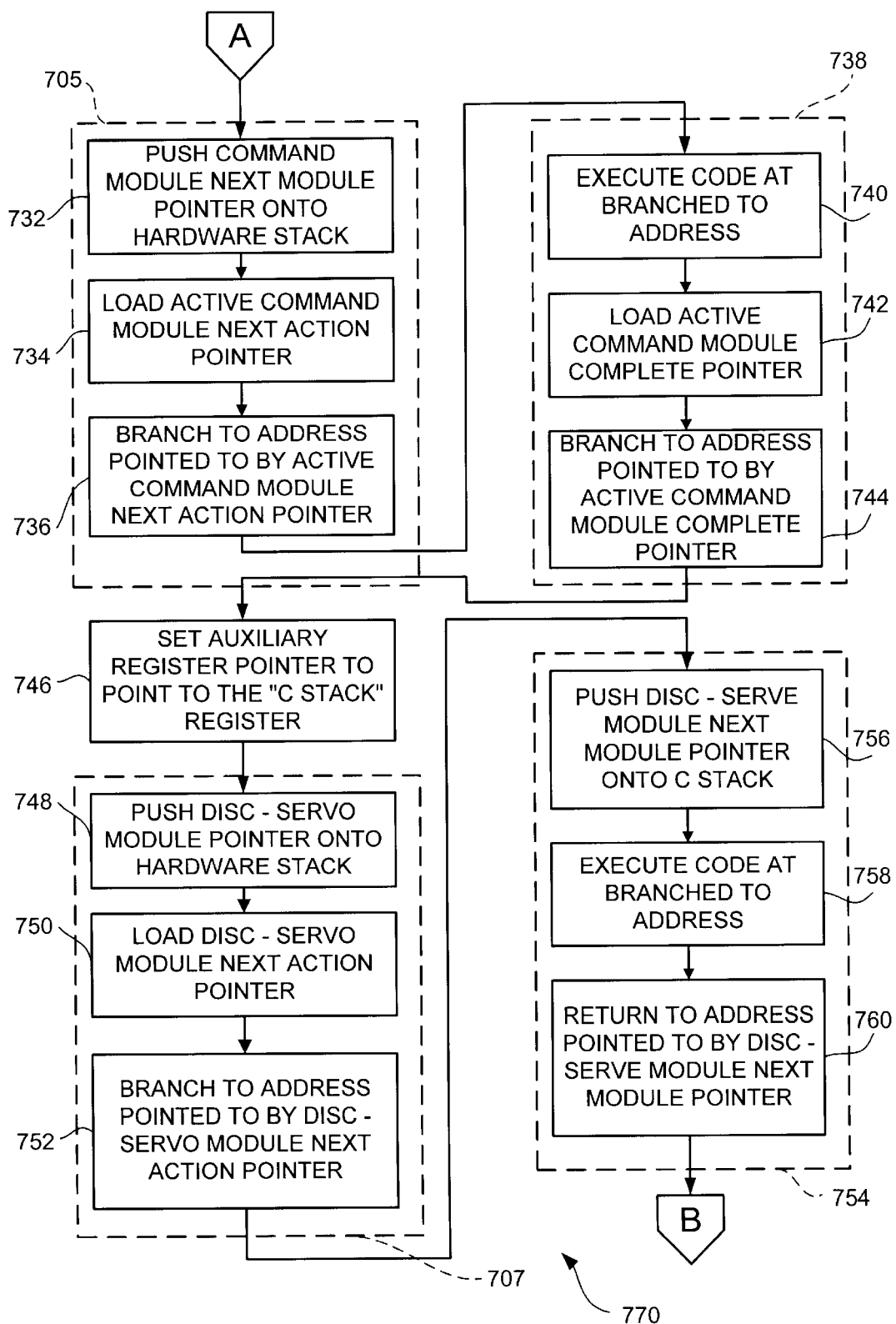

In a third embodiment of scheduler module 222, the logical flow of which is shown in FIGS. 7A and 7B, scheduler 222 comprises a computer program or routine which is functional to operate on processor module 212, wherein the processor module 212 utilizes a hardware stack. A hardware stack, as that term is used herein, comprises a limited number of hardware registers within a processor which are used as a quickly accessible LIFO stack by the processor module 212, such as in the Texas Instruments Model TMS32OC27LP Digital Signal Processor (DSP). DSPs in general, and the Texas Instruments Model TMS32OC27LP in particular, offer limited hardware stack support. For example, the hardware stack in the TMS32OC27LP is limited to eight words.

Processors which employ limited hardware stacks, such as the Texas Instruments Model TMS32OC27LP, often provide what is termed a software stack to accommodate functions which require more than a minimal amount of hardware stack space for their operation. In particular, the "C" code compiler for the Texas Instruments Model TMS32OC27LP constructs a software stack called a "C stack," which is located in memory. The C stack is a data structure defined in an area of memory accessible to the processor which is used for allocating local variables, passing functions to arguments, saving processor status, saving function return addresses, saving temporary results, and saving registers for functions which are originally written in the C programming language. Upon compilation of the programming code which has been written in the C programming language into assembly language, the compiler for the processor typically includes what is referred to as a "C code wrapper" around the C code which manages the movement of data from the hardware stack to the C stack. In this way, the processor can keep separate and manage code which has been originally written in C from code which has been originally written in assembly language. The concepts involved in the C stack may also be employed in other software stacks, such as software stacks which are used for handling code which is written in other high level languages or for handling assembly code which requires more than the minimal hardware stack space that is provided by the processor. In this embodiment of the present invention, a software stack is also employed for the assembly code.

In processors such as the Texas Instruments Model TMS32OC27LP, which employ multiple software stacks, a facility must be provided for indicating the location of the various software stacks in memory. This facility is provided in the Texas Instruments Model TMS32OC27LP by a number of auxiliary registers within the processor. Located within one or more of the auxiliary registers are pointers pointing to the various locations in memory where the particular software stacks resides. That is, there is a dedicated register within the processor for each software stack. One of the registers, an in the case of the TMS32OC27LP, is used exclusively as a stack pointer to the C stack. Another register within the processor, called the auxiliary register pointer in the Texas Instruments Model TMS32OC27LP, indicates, or points to, the auxiliary register which is currently being used by the processor. The pointer in this register is typically modified during execution of a program or routine to point to the software stack currently being used by the processor. As such, it is important that prior to executing a program or routine within the processor which uses a software stack, that the auxiliary register pointer points to the auxiliary register which points to the applicable software stack. Failure to set the auxiliary pointer register to point to the auxiliary register which points to the correct stack before the execution of program code using a software stack, may cause the destruction of data contained in processor memory and the failure of the code which is being executed.

As in the first and second embodiments of the disc drive scheduler shown in FIG. 5 and FIG. 6, respectively, the third embodiment of the scheduler module 222 shown in FIGS. 7A and 7B includes module launch points 701, 703, 705, and 707, which are written in assembly language and actions and sub-actions which may be written in either assembly language or in a higher level programming language, such as C. As such, the programming code of the module launch points and the actions which are written in assembly language are handled by the hardware stack, while the modules which were originally are written in the C programming language will use the C stack.

While the construct and implementation of a software stack, such as the C stack, is useful in processors utilizing a limited hardware stack, the construct of the C stack also slows down the overall speed of the processor when performing actions or sub-actions of scheduler module 222 which have been written in C. One cause for the slowing of the function of the processor involves the constructs of the processor with respect to calling an action requiring the use of the C stack. When an action requiring the use of the C stack is called, the constructs of the processor require that a number of steps be performed with respect to trading data between the hardware stack and the C stack, such as saving various state data to the hardware stack and setting various registers, including resetting the auxiliary pointer register to point to the C stack if the auxiliary pointer register has been changed during the execution of the called action. These steps require a significant amount of processor time to perform, and thus slow down the performance of scheduler module 222.

A unique solution to the above noted problems related to the call instruction in the processor, involves the use of a branch instruction in the place of a call instruction when executing an action requiring the C stack. One significant benefit of branching to an action requiring the use of the C stack rather than calling the action, relates to the simplicity, and thus the time taken to perform the branch instruction as opposed to the call instruction. Additionally, the use of a branch instruction will allow the operational flow of scheduler module 222 to flow directly from an action requiring the use of the C stack to any of the module launch points without the need to return to the module launch point which called the action.

One problem associated with the use of a branch instruction in this manner relates to the auxiliary register pointer. That is, unlike the call instruction, the branch instruction will not reset the auxiliary register pointer to point to the auxiliary register which points to the C stack if the action which has been branched to has changed the auxiliary register pointer. As noted above, failure to reset the auxiliary register pointer before executing another action requiring the use of the C stack may cause the destruction of data contained in processor memory and the failure of scheduler 222.

Another problem associated with the use of a branch instruction in this manner is that, unlike the call instruction, the branch instruction does not require or use a return address. For example, when an action requiring the use of the C stack is called by a module launch point, such as 701, 703, 705, or 707, the first thing the call instruction does is to pop the return address off of the hardware stack and pushes it onto the C stack. When the action is complete, the call instruction copies the return address from the C stack and pushes it onto the hardware stack. In contrast, when an action requiring the use of the C stack is branched to from a module launch point, the branch instruction jumps to the location in the "C code wrapper" that copies the hardware stack to the C stack. However, when this occurs, the information (address or data) which is present at the top of the hardware stack is copied to the C stack instead of the return address. For this reason, steps must be taken to assure that when a branch operation is used in this manner, the proper address for the next module to be completed by the scheduler 222 is present at the top of the hardware stack when the branch instruction is executed.

FIGS. 7A and 7B show an example of a logical flow 770 of a third computer program embodiment of the scheduler module 222. For the purposes of the example shown in FIGS. 7A and 7B, entry 700 into the scheduler 222 is shown occurring at host module launch point 701. It is assumed in this example that the auxiliary pointer register has been set to point to the C stack auxiliary register prior to the entry into scheduler 222.

Upon entry into the host module launch point 701, a push operation 702 pushes the next module pointer 314 associated with the host module 224 onto the hardware stack. Next, a load operation 704, loads the next action pointer 322 associated with the host module 224. A branch operation 706 then branches to the address of the action 708 pointed to by the next action pointer 322 loaded by the load operation 704. In this way the host module launch point 701 "selects" the action 703 of the host module 224 which is to be executed. In this example, the action selected 708 was originally written in assembly language. As such, this action 708 will not use the C stack, but may alter the auxiliary pointer register, either during its operation or to point to a software stack being used by the assembly action. An execute operation 710 then executes the action located at the address branched to by the branch operation 706. Next, a load operation 712 loads the host active command module complete pointer. (The host active command module complete pointer is a pointer to a segment of code in the host module launch point 301 which resets the auxiliary register pointer to point to the C stack auxiliary register.) A branch operation 714 then branches to the address pointed to by the host active command module complete pointer. Set operation 716 then sets the auxiliary register pointer to point to the C stack auxiliary register. The operational flow of scheduler 222 then proceeds on to queue processor module launch point 703.

Upon entry into the queue processor module launch point 703, a push operation 718 pushes the next action pointer 324 associated with the queue processor module 228 onto the hardware stack. Next, a load operation 720, loads the next action pointer 324 associated with the queue processor module 228. A branch operation 722 then branches to the address of the action 724 pointed to by the next action pointer 324 loaded to by load operation 720. In this way the queue processor module launch point 703 "selects" the action 724 of the queue processor module 228 which is to be executed. In this example, the action selected 724 was originally written in the C programming language. As such, this action 724 will be using the C stack. Push operation 726 then pushes the next module pointer 316 associated with the queue processor module onto the C stack. An execute operation 728 then executes the action located at the address branched to by branch operation 722. Finally, to complete action 724, a return operation 730 returns to the address pointed to by the next module pointer 316 associated with the queue processor module 228. In this case, the next action pointer 316 points to the active command module launch point 705. By branching to the address pointed to by the next action pointer 324, the operational flow of scheduler 222 may proceed on to the module launch point pointed to by the next module pointer 316 which was pushed on to the C stack by push operation 726, thus allowing flexibility in the operational flow of the scheduler 222. If the address pointed to by the next action pointer 316 had been called rather than branched to, the operational flow of scheduler 222 would have necessarily returned to the queue processor module launch point 703. If the next module pointer 316 would not have been pushed onto the C stack after the branch, the operational flow of scheduler 222 would have been indefinite and scheduler 222 would likely have failed.

Upon entry into the active command launch point 705 (FIG. 7B), a push operation 732 pushes the next module pointer 318 associated with the active command module 232 onto the hardware stack. Next, a load operation 734, loads the next action pointer 326 associated with the active command module 232. A branch operation 736 then branches to the address of the action 738 pointed to by the next action pointer 326 loaded to by load operation 734. In this way the active command module launch point 705 "selects" the action 738 of the active command module 232 which is to be executed. In this example, the action selected 738 was originally written in assembly language. As such, this action 738 will not use the C stack, but may alter the auxiliary pointer register. An execute operation 740 then executes the action located at the address branched to by the branch operation 736. Next, a load operation 742 loads the active command active command module complete pointer. A branch operation 744 then branches to the address pointed to by the active command active command module complete pointer. A set operation 746 then sets the auxiliary register pointer to point to the C stack auxiliary register. The operational flow of the scheduler 222 then proceeds on to disc/servo module launch point 707.

Upon entry into the disc/servo module launch point 707, a push operation 748 pushes the next module pointer 320 associated with the disc/servo module 236 onto the hardware stack. Next, a load operation 750, loads the next action pointer 328 associated with the disc/servo module 236. A branch operation 752 then branches to the address of the action 754 pointed to by the next action pointer 328 pointed to by the load operation 720. In this way the disc/servo module launch point 707 "selects" the action 754 of the disc/servo module 236 which is to be executed. In this example, the action selected 754 was originally written in the C programming language. As such, this action 754 will be using the C stack. A push operation 756 then pushes the next module pointer 320 associated with the disc/servo module 236 onto the C stack. An execute operation 758 then executes the action located at the address branched to by the branch operation 752. Finally, to complete action 754, a return operation 760 returns to the address pointed to by the next module pointer 320 associated with the disc/servo module 236. In this case, the next module pointer 320 points to the host module launch point 701. The operational flow of the scheduler module 222 may continue on in the circular manner shown in FIGS. 7A and 7B.

Queue Processor Module

As described above, processors in a disc drive device may receive multiple commands to read and write data to the hard discs within the disc drive. When commands are received faster than the processor can execute the commands, the commands may be held in what is known as a command queue to await their turn for processing by the processor.

The simplest type of command queue is a first-come-first-serve command queue. This type of queue, as the name implies, simply presents the commands to the processor in the order that they are received. The first-come-first-serve queue is simple to implement as it does not require a sophisticated routine to maintain the queue. The first-come-first-serve queue, however, does not allow for any type of optimization of the ordering of the commands.

Command optimization is particularly important in disc drives, where high-speed data through-put is required. In a disc drive, commands are often received faster than they can be executed. When this occurs, the commands which are waiting to be executed need to be queued or cached for later processing. As the commands coming into the disc drive are not necessarily received in an optimal order for processing, optimization of the queued or cached commands is desirable. For instance, a disc drive device may receive commands to read and write data at a variety of locations on the hard discs within the disc drive. Optimally, these commands would be processed in a manner which would minimize the movement of the disc drives read/write heads across the disc. Ordering the commands in this manner is called command queue reordering. Command queue reordering allows for a more efficient use of the microprocessor as well as a more efficient use of the hardware, if any, being controlled by the microprocessor.

There are a number of ways to order the commands in a priority queue. Traditionally, disc drives have sorted commands in an order that minimizes seek time between the various commands. The seek time is the time required for the read/write element to radially move across or traverse cylinders between the present cylinder over which the read/write element is positioned and the cylinder to be addressed by the particular command. However, seek time is only one of two components of the true access time of a command. The other component is the rotational latency time or the amount of time the disc drive spends waiting for the appropriate data to rotate under the read/write element. The rotational latency time is a significant part of the total access time for all but the longest seeks. On average, it is the dominant component of the total access time for relatively short seeks.

As noted above, the queue processor module 228 of the disc drive 100 manages a number of queues which are used for the entry, sorting, and dispatching of commands in the control module 202. As shown at 800 in FIG. 8, an embodiment of the queue processor 228 includes five managed queues: a free list queue 810, an insert queue 812, a sorted queue 814, a ready queue 816, and an active queue 818. In general, the queues are used to hold, sort, and execute command nodes in computer-readable media, such as the buffer 208 of the interface module 204 through pointer manipulation.

Computer readable media, as used herein, can be any available media that can be accessed by a processor, such as the processor module 212, described above. By way of example, and not limitation, computer-readable media might comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disc storage or other magnetic storage devices, or any other medium that can be used to store the desired information and that can be accessed by a processor, such as processor module 212.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 8:
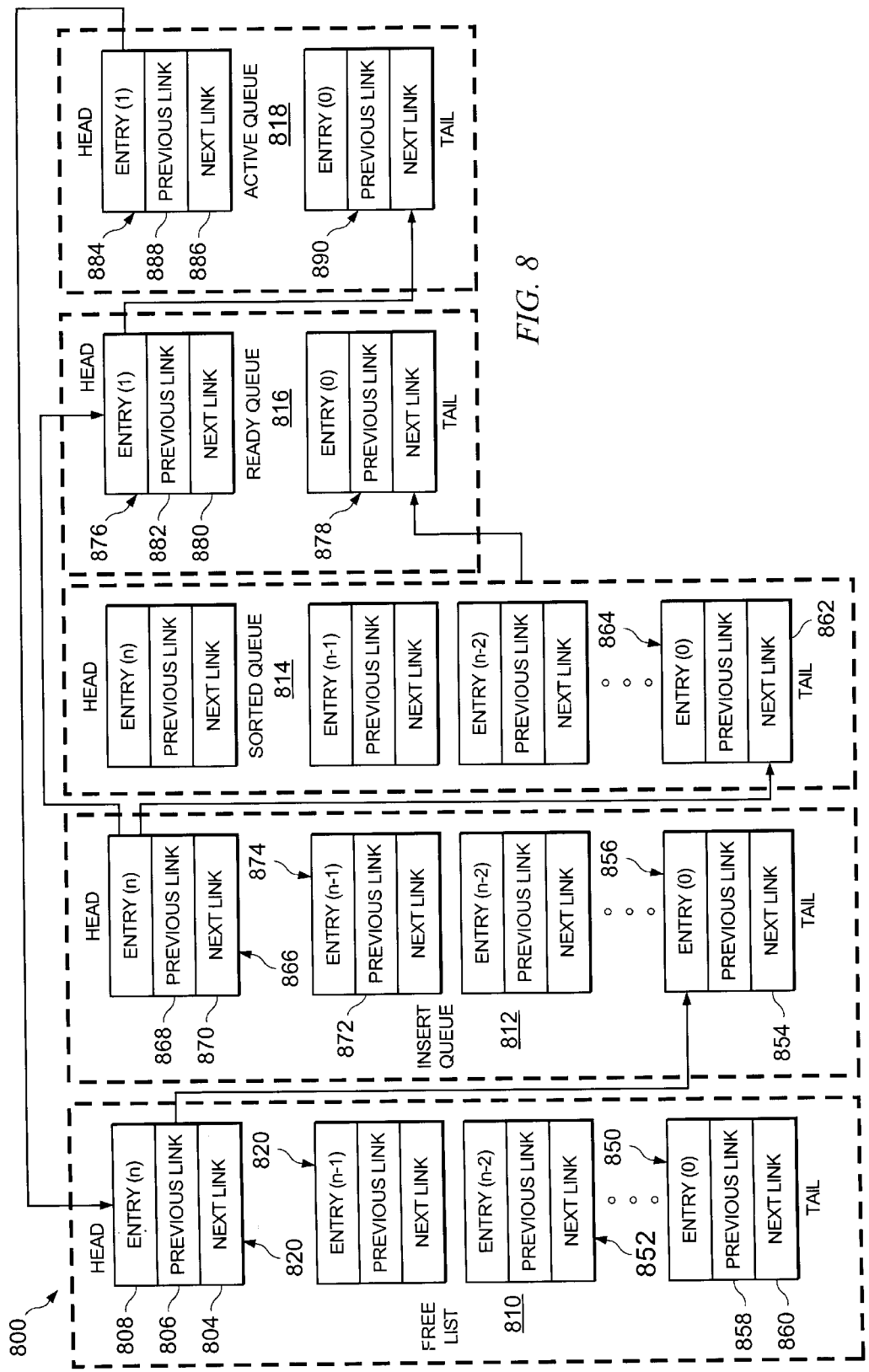
FIG. 8 illustrates an embodiment of a command node queue processor of the present invention having a plurality of queues.

As shown in FIG. 8, each of the queues 810, 812, 814, 816, and 818, comprises a data structure containing a number of command nodes 820. A command node 820 is a predefined data structure consisting of a number of fields which contain the information necessary to carry out a command in a processor, such as the processor module 212. (FIG. 2) For clarity, FIG. 8 illustrates the command nodes 820 in a simplified manner wherein only a next link 804, a previous link 806, and an entry field 808 of the command nodes 820 are shown.

Figure 9:
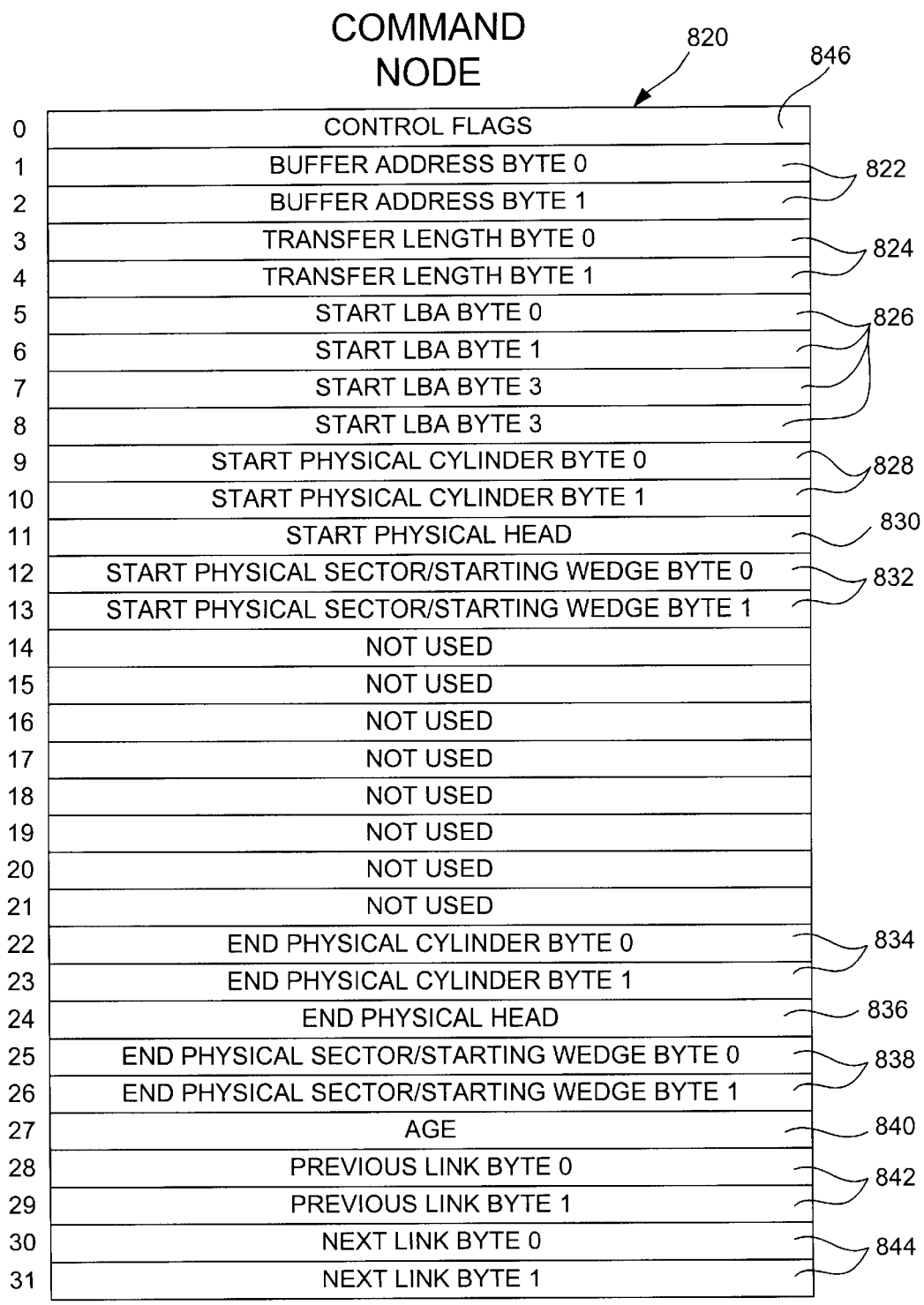
FIG. 9 illustrates an exemplary command node for the command node queue processor shown in FIG. 8.

Command nodes 820 typically include a number of fields containing data relevant to specific commands and specific systems. For example, as shown in FIG. 9, a command node for the disc drive 100, preferably includes fields which specify the buffer address of the information to be transferred 822, the transfer length of the information to be transferred 824, the start of the logical block address (LBA) issued or requested by the host computer 826, the start of the physical cylinder where data is to be written/read 828, the start of the physical head 830, the start of the physical sector/starting wedge where data is to be written/read 832, the end of the physical cylinder where data is to be written/read 834, the end of the physical head 836, the end of the physical sector/starting wedge where data is to be written/read 838 and the end of the physical cylinder where data is to be written/read 840. Additionally, each command node 820 preferably includes fields for a previous link pointer 842 and fields for a next link pointer 844.

A command node 820 will also typically include a field for specifying what type of command (read, write, etc.) is to be executed in relationship to the command node 820. For example, as shown in FIG. 9, the command node 820 may include a field 846 for control flags which specify the command associated with the command node 820. The structure of the command node 820, that is the number of fields and the types of data which are required in the fields is dependent on the types of commands executed by the system and by the type of system employing the queue processing program, such as a SCSI device or an AT device. The structure of the command node 820 is preferably set at the compile time of the queue processing program. It should be understood that the command node 820 illustrates but one example of the configuration and contents of a command node for a disc drive device. Any number of different command node configurations and contents may be used depending on the environment or application in which or for which the queue processor 228 may be used or employed.

Four of the queues, 812, 814, 816, and 818 of the queue processor module 228 preferably reside in computer readable media, such as buffer memory 208, and are preferably defined by a doubly-linked list structures and by indicators which indicate the locations of the heads and tails of the queues. Preferably, the indicators comprise pointers located within a registers in a processor module 212. For illustration purposes indicators will be discussed herein as pointers, however, it is to be understood that the indicators may comprise other types of mechanisms which are operable to indicate the locations of the heads and tails of the various queues.

As is discussed in greater detail below, the queue processor module 228 controls, among other things, the extraction and insertion of command nodes 820 from and into the various queues. It will be understood to one skilled in the art that the terms extract, insert, and move as used relative to repositioning command nodes from one queue to another does not necessarily mean that the command nodes are physically moved from one location in memory to another. As is well known in the art, the location of a command node or other element in a data structure such as a queue is often defined by the relationship of the command nodes to one another as defined by the rules or format of the data structure. For example, in the command nodes 820 as described above, previous link pointers 852 and next link pointers 854 may be used to redefine the location of a command within a particular queue or between queues without moving the command node from one physical memory location to another.

As shown in FIG. 8, the free list queue 810 is preferably defined by a singly-linked structure and by a register which contains a pointer which points to the command node at the head of the free list queue 810. The free list queue 810 is preferably defined by a singly-linked list of free, or unused command nodes within memory, such as the buffer memory 208. While the structure of a command node 820 in the free list queue 810 is shown as including fields for both next link and previous link pointers, preferably only the next link pointer fields of the command nodes 820 are used in the free list queue 810. The free list queue 810 provides a source for free or unused command nodes for the queue processor module 228. The size of the free list queue 810 is preferably limited only by the amount of memory, such as buffer 208, allocated to the queue processor module 228 at the compile time of the queue processor module 228, minus the amount of memory being used by the other queues 812, 814, 816, and 818 of the queue process, or by other processes implemented by the processor module 212.

The insert queue 812 is preferably a doubly-linked list containing command nodes 820 which have been extracted, or de-queued, from the free list queue 810 and which have been populated by the incoming commands from the host computer 200. The insert queue 812 provides a "holding area" for command nodes entering or being managed by the queue processor module before they are moved to either the sorted queue 814 or the ready queue 816, as is discussed more thoroughly below. The size of the insert queue 812, that is the number of command nodes which may be held in the insert queue 812 is preferably not predetermined. The insert queue 812 may continue to grow as new commands are populated and inserted in the insert queue 812. The size of the insert queue 812 is bounded only by the available memory allocated to the queue processor module 228 minus the amount of memory being used by the other queues 810, 814, 816, and 818.

The sorted queue 814 is a doubly-linked list which provides a "holding area" for command nodes 820 which have been extracted from the insert queue 812 and which are waiting to be sorted and inserted into the ready queue 816. Command nodes 820 are preferably extracted from the insert queue 812 and inserted into the sorted queue 814 only when the ready queue 816 is not empty. If the ready queue 816 is empty, command nodes 820 are extracted from the head of the insert queue 812 and inserted into the tail of the ready queue 816, "bypassing" the sorted queue 814.

When the ready queue 816 is not empty, command nodes 820 from the insert queue 812 are preferably extracted from the head of the insert queue 812 and inserted in the tail of the sorted queue 814 as follows. Before a command node 820 is extracted from insert queue 812 and inserted into the sorted queue 814 a determination must be made as to whether there is a "collision" between the command node 820 being extracted from the head of the insert queue 812 and any of the command nodes in sorted queue 814. That is, a determination must be made as to whether there are any undesired overlaps or incompatibilities of the commands embodied in the command node 820 being extracted from insert queue 812 and any of the command nodes 820 in the sorted queue 814. If a collision is detected between the command node 820 being extracted from the insert queue 812 and any of the command nodes in the sorted queue 814, action must be taken to avoid the collision. For example, in the case where a command node 820 at the head of the insert queue 812 includes a write command to a particular area on a disc 108 of the hard drive 100, a determination must be made as to whether the area of the disc 108 which is to be written to by the write command overlaps, is a subset of, or a superset of an area of the disc 108 which is to be written to by a command in a command node 820 located in sorted queue 814. If the area of the disc 108 which is to be written to by the write command overlaps or is a subset of an area of the disc 108 which is to be written to by a command in a command node 820 located in the sorted queue 814, a collision has occurred and this collision must be corrected before the command node 820 at the head of the insert queue 812 can be inserted into the sorted queue 814.

The correction of a collision between a command node 820 at the head of the insert queue 812 and a command node 820 in the sorted queue 814 may occur in a number of ways and is dependent on the type of commands issued in the system using the queue processor module 228. For example, if the collision occurs between two command nodes which include write commands to the disc 108 of a disc drive 100, collision correction may occur as follows. If a write command of a command node 820 at the head of the insert queue 812 fully overlaps a write command of a command node 820 in the sorted queue 814, then the command node, including the fully overlapped write command, is removed from the sorted queue 814. If a write command of a command node 820 at the head of the insert queue 812 partially overlaps a write command of a command node 820 in the sorted queue 814, then the write command of the command node in the sorted queue 814 is adjusted or truncated so the overlap is eliminated. Finally, if a write command of a command node 820 at the head of the insert queue 812 is a subset of a write command of a command node 820 in the sorted queue 814, then the command node at the head of the insert queue 812 should be held in the insert queue 812 until the colliding command node 820 in the sorted queue 814 is no longer present in the sorted queue 814. Collision correction enhances the speed of commands through the queue processor module 228 by removing or correcting those commands which are duplicative or overlapping. The previous example is but one illustration of a possible collision correction mechanism in the queue processor module 228. A number of other collision correction mechanisms may be contemplated and implemented in the queue processor module 228 without departing from the scope of the present invention.

If no collision has been detected between the command node 820 at the head of the insert queue 812 and a command node 820 in the sorted queue 814, or if a collision has been detected and corrected, the extraction of the command node 820 from insert queue 812 and insertion of that command node 820 into the sorted queue 814 preferably occur as follows. If the sorted queue 814 is empty, the pointers in the registers which point to the command nodes(s) at the head and tail of the sorted queue 814 are set to point to the command node 866 at the head of the insert queue 812 and the pointers in the next link field 870 and the previous link field 868 of the command node 866 at the head of the insert queue 812 are set to null. Additionally, the previous link field 872 of the next command node 874 is set to null and the pointer in the register which points to the command node at the head of insert queue 812 is set to point to the next command node 874, in insert queue 812.

If the sorted queue 814 is not empty, the pointer in next link field 862 of command node 864 at the tail of sorted queue 814 is set to point to the command node 866 at the head of insert queue 812. The pointer in previous link field 868 of the command node 866 at the head of the insert queue 812 is set to point to command node 864 at the tail of the sorted queue 814 and the pointer in next link field 870 of the command node 866 at the head of the insert queue 812 is set to point to null. The pointer in previous link field 872 of the command node 874 in the insert queue 812 is set to null. Additionally, the pointer in the register which points to the command node at the head of the insert queue 812 is set to point to the next command node 874 in the insert queue 812, and the pointer in the register which points to the tail of the sorted queue 814 is set to point to the command node 866 at the head of the insert queue 812. In this way, the command node 866 at the head of the insert queue 812 becomes, or is inserted into, the sorted queue 814.

The ready queue 816 is a doubly-linked list preferably containing a maximum of two linked list nodes 876 and 878. As described above, the command nodes 820 in the ready queue 816 have been extracted either from the head of the insert queue 812 or from the sorted queue 814 and inserted into the ready queue. The ready queue 816 holds the next command node 820 that is nearest the commands in the active queue 818. By using two entries in the ready queue 816 different levels of sorting optimization are possible.

In the case where a command node 820 is extracted from the sorted queue 814 for insertion into the ready queue 816, the command 820 which is to be inserted into the ready queue 816 from the sorted queue 814 is sorted or selected according to a predefined scheme. For example, command nodes 820 for read and/or write commands in the disc drive 100 may be sorted to optimize seek time or rotational latency. Typically, the sorting algorithm being applied to the sorted queue 814, will compare various fields within the command nodes 820 in the sorted queue 814 to determine the preferred or optimal command node 820 for a specified optimization. A number of different sorting algorithms may be used to determine which of the nodes in the sorted queue 814 is optimal. However, a Rotational Positioning Sorting (RPS), or traveling salesmen type algorithm is preferably used to sort the sorted queue 814. For example, the algorithm described in U.S. Pat. No. 5,570,332 for "Method for Reducing Rotational Latency in a Disc Drive" to Heath, et al., which is incorporated herein by this reference may be used to sort the sorted queue 814.

After a command node 820 has been selected from the sorted queue 814, the selected command node 820 is preferably then inserted into the ready queue 816 if the ready queue 816 includes only one command node 820. If the ready queue 816 includes two command nodes 820, insertion of the command node 820 from the sorted queue 814 must be delayed until the ready queue 816 includes only one command node 820. If the ready queue 816 is empty, insertion of the command node 820 from the sorted queue must be delayed until a command node is inserted in the ready queue 816 from the insert queue 812, as described above. If the ready queue 816 includes only one command node 820, the pointer in the previous link field of the command node 820 which has been selected from the sorted queue 814 is set to point to the single command node in the ready queue 816 and the pointer in the next link field of the selected command node 820 is set to null. The pointer in next link field 880 of the command node 876 at the head of the ready queue 816 is set to point to the selected command. Additionally, the pointer in the register which points to the command node at the tail of the ready queue 816 is set to point to the selected command 820.

The active queue 818 is a doubly linked list which preferably includes only two command nodes 884 and 890. The active queue 818 contains the command nodes which are currently being processed by the microprocessor of the disc drive. By including two command nodes 884 and 890 the active queue 818 allows for two command nodes to be processed simultaneously, such as command nodes which control access to two different separately controlled actuators.

Commands nodes are preferably extracted from the head of the ready queue 816 and inserted into the active queue 818 as follows. If the active queue 818 is empty, the pointers which point to the command nodes at the head and tail of the active queue 818 are set to point to the command 876 at the head of ready queue 816. The pointer in the register which points to the head of the ready queue 816 is then set to point to the command node 878 at the tail of the ready queue 816. Additionally, the pointers in the next link field 880 and previous link field 882 of the command node 876 at the head of the ready queue 816 are set to null.

If the active queue 818 contains only one command node 820, the pointer in the register which points to the command node at the tail of the active queue 818 is set to point to the command node 876 at the head of the ready queue 816 and the pointer in the register which points to the command node 820 at the head of the ready queue 816 is set to point to the command node 878 at the tail of the ready queue 816. Additionally, the pointer in the previous link field 882 of the command node 876 at the head of the ready queue (now in the active queue 818) is set to point to the command node 884 at the head of active queue 818.

Once a command node is located at the head of the active queue 818 the command node may be called by the microprocessor, such as microprocessor 212 of disc drive 100. Once the command node is called by the processor module 212, it is parsed and the information in that command node tells the processor module 212 what actions to take, such as where to seek (what cylinder and physical head to select), where in memory buffer 208 data is to be taken from, and the length of the transfer.

After a command node has been called or used (a "used command node") by the processor module 212 of disc drive 100, the used command node is preferably returned to the free list queue 810 as follows. The pointer in the next link field 886 of the used command node 884 at the head of the active command queue 818 is set to point to the command node 850 at the tail of the free list queue 810 and the pointer in the previous link field 888 of the used command node 884 at the head of the active queue 818 is set to null. Additionally, the register which points to the command node 820 at the head of the active queue 818 is set to point to the command node 820 at the tail of the active queue 818 and the pointer in the register which points to the head of the free list queue 810 is set to point to the command node 884 at the head of the active queue 818.

An additional understanding of the functioning of the queue processor module and it'interaction with the scheduler module may be had with reference to the flow diagrams shown in FIGS. 11–19.

Figure 10:
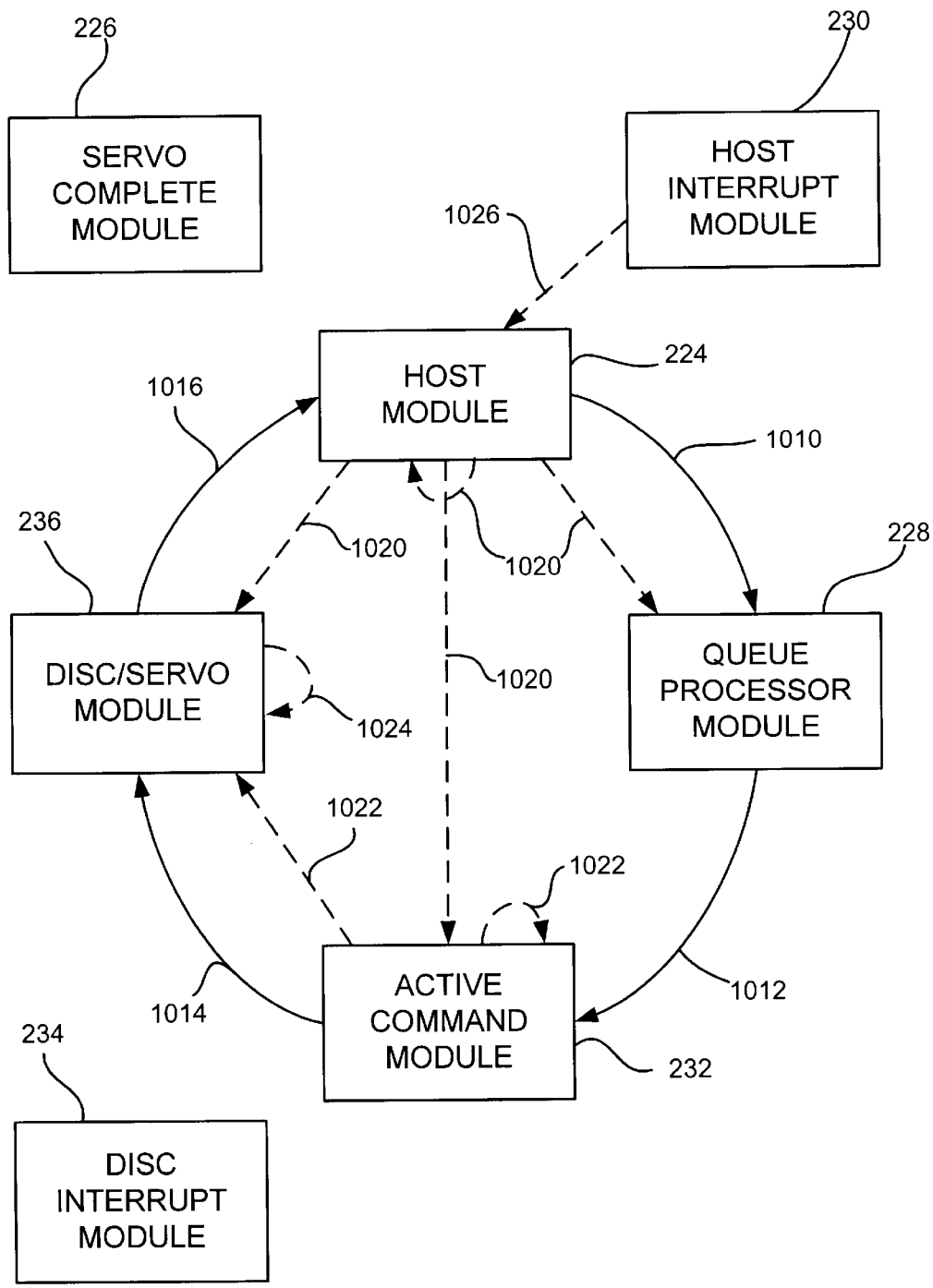
FIG. 10 illustrates a simplified functional block diagram of a disc drive control module of the disc drive shown in FIG. 1 in accordance with a preferred embodiment of the present invention.

FIG. 10 shows a general representation of the interaction of the various modules of an embodiment of the present invention. In this embodiment of the present invention the next module indicator 314 associated with host module 224 is set to queue processor module 228, the next module indicator 316 associated with queue processor module 228 is set to the active command module 232, the next module indicator 318 associated with the active command module 232 is set to the disc/servo module 236, and the next module indicator 320 associated with the disc/servo module 236 is set to the host module 224. As such, the scheduler module 222 will launch each of the cooperative modules 224, 228, 232, and 236 in a round robin type fashion. The order of launch of these cooperative modules is indicated in FIG. 10 by the solid lines 1010, 1012, 1014, and 1016.

The dashed lines in FIG. 10 indicate the control or influence the various modules have with respect to the next action pointers of the modules. For example, as indicated by the dashed lines 1020, the host module 224 is operable to modify the next action pointers of the queue processor module 228, the active command module 232, and the disc/servo module 236, as well as it'own next action module. As indicated by dashed lines 1022, the active command module 232 is operable to modify the next action pointers of the disc/servo module 236, as well as it'own next action module. As indicated by dashed lines 1024, the disc/servo module 236 is operable to modify it'own next action pointer. Finally, as indicated by dashed line 1026, the host interrupt module 230 is operable to modify the next action pointer of the host module 224.

As shown in FIG. 10, the non-cooperative, or preemptive modules 230, 234, and 226 are not launched by the scheduler module 222. These modules are preferably responsive to various control and interrupt signals from the host computer 200 or the other modules of the disc drive 100, as discussed in greater detail below.

As described above, the scheduler module 222 is preferably set up in a round robin fashion such that the host module 224, the queue processing module 228, the active command module 232, and the disc/servo module 236 are launched in succession. The operation of an embodiment of the present invention will now be described beginning with the host interrupt module 230.

Figure 11:
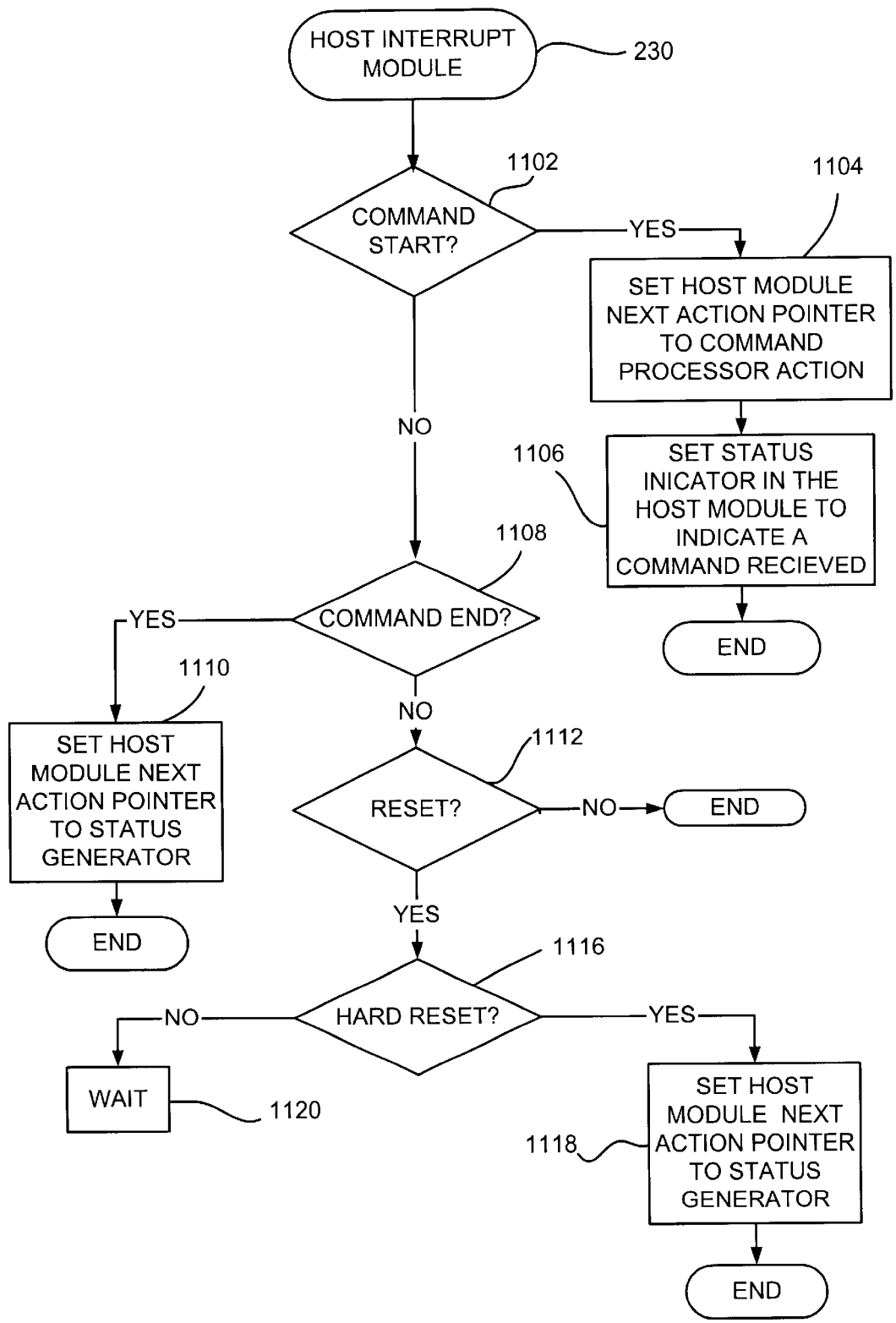
FIG. 11 illustrates an exemplary operational flow of a host interrupt module of the disc drive control module shown module in FIG. 10 in accordance with a preferred embodiment of the present invention.

In general, the host interrupt module 230 receives signals from the host computer 200, determines the type of signal received, and modifies the host module'224 next action pointer to point to the next appropriate action. As shown in FIG. 11, when the host interrupt module 230 receives a signal from the host 200, a command start detector 1102 first determines if the signal received is a command start signal. If the signal received is a command start signal, set operation 1104 sets the host module's next action pointer to a new command processor action which starts the data transfer if needed and either sets up a command node in the insert queue or sends the command directly to the disc/servo module. Next, set status operation 1106 sets a status indicator in the host module to indicate that a new command has been received and host interrupt module 230 is ended. If the signal received is not a command start signal, a command end detector 1108 determines if the signal received is an end of command signal. If the signal received is an end of command signal, set operation 1110 sets the host module'next action pointer to a status generator action which sets up the correct interface error status if an error occurred or clears any error status and performs the required protocol to complete the command. The host interrupt module 230 is ended.

If the signal received is not a command end signal, a reset detector 1112 determines if the signal received is a reset signal. If the signal received is not a reset signal the host interrupt module 230 is ended. If the signal received is a reset signal, a hard reset detector 1116 determines if the signal is a hard reset signal. As used here, a hard reset is a reset that comes to the disc drive over a physical line from the host computer 200 which is dedicated for the purpose of resetting a peripheral. As long as the signal on the hard reset line is asserted, the disc drive is held in a reset state. A software reset is a reset that occurs by writing a sequence in either memory mapped or I/O mapped register in the disc drive that causes a reset condition. That soft reset condition stays in affect until the sequence is cleared. If the signal received is a hard reset signal, set operation 1118 sets the next action pointer in the host module to a hard reset handler action which checks for a hardwired reset and performs the necessary protocol to clear the reset condition. The host interrupt module 230 is then ended. If the signal received is not a hard reset, that is, if the signal received is a soft reset, or a software reset wait for slave if present and perform necessary protocol to clear reset condition.

Turning now to the host command module 224. In general, the function of the host module is to determine whether a given command node is or is not appropriate for queuing. That is, the host module will determine if a command node is of a type which will be handled by the queue processor module 228 or by the disc/servo module 236. For example, if the disc drive which incorporates the present invention is an AT type disc drive, the queue processor will handle only write commands and not read commands.

Figure 12:
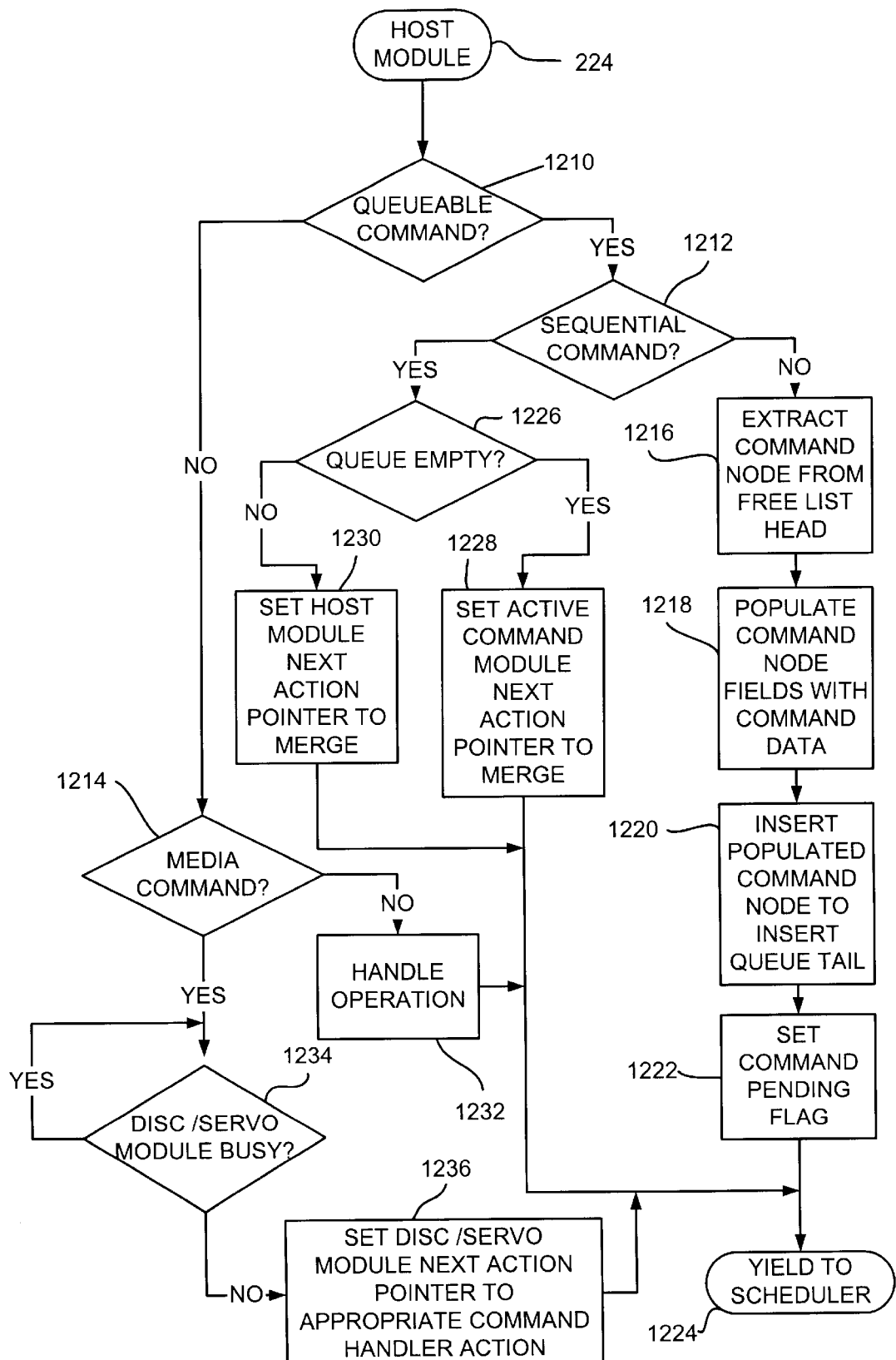
FIG. 12 illustrates an exemplary operational flow of a host module of the disc drive control module shown module in FIG. 10 in accordance with a preferred embodiment of the present invention.

As shown in FIG. 12, when the host module is launched by the scheduler module 222, a queueable command detector 1210 determines whether a command is queueable. If the command is queueable, a sequential command detector 1212 is invoked. If the command is not queueable, media command detector 1214 is invoked. If a command is determined to be queueable, sequential command detector 1212 determines if the command is sequential with the previous command handled by the host module 224. If the command is sequential with the previous command, a queue empty detector 1226 determines if the queue processor module 228 is empty. That is, the host module 224 communicates with the queue processor module 228 to determine if either the insert queue 812, the sorted queue 814, the ready queue 816, or the active queue 818 contain command nodes. If the queue processor module 228 is empty, set operation 1228 sets the next action pointer in the active command module 232 to merge the current command with the current active command being handled by the disc/servo module, and the host module 224 yields back to the scheduler module 222. If the queue is not empty, set operation 1230 sets the next action pointer in the host module 224 to wait for the queue to empty so that it can start a sequential write operation that other commands can merge into later, and the host module 224 yields back to the scheduler module 222.

If the sequential command detector 1212 determines that the command is not sequential, extract operation 1216 extracts a command node from the head of the free list queue 810. Populate command 1218 then populates the fields of the extracted command node with information from the incoming command. Insert operation 1220 then inserts the populated command into the tail of the insert queue and set command 1222 sets a command pending flag in the queue processor module 228. Finally, the host module 224 yields back to the scheduler module 222.

If the queueable command detector 1210 determines that a command is not queueable, the media command detector 1214 determines if the not queueable command is a media command, such as a read command in an AT type disc drive. If the command is not a media command, for example commands such as read buffer, write buffer, identify device, set parameters, and various diagnostic commands, then the-handle operation 1232 executes the appropriate command handler and the host module 224 yields back to the scheduler 222. If the media command detector 1214 detects a media command, the-disc/servo busy detector 1234 determines if the disc/servo module 236 is busy. If the disc/servo module 236 is busy, the disc/servo busy detector 1234 is repeated until such time that the disc/servo module 236 is not busy. If the disc/servo module 236 is not busy, set operation 1236 sets the next action pointer in the appropriate command handler actions to handle the specific type of command received, and the host module 224 yields back to the scheduler module 222.

Figure 13:
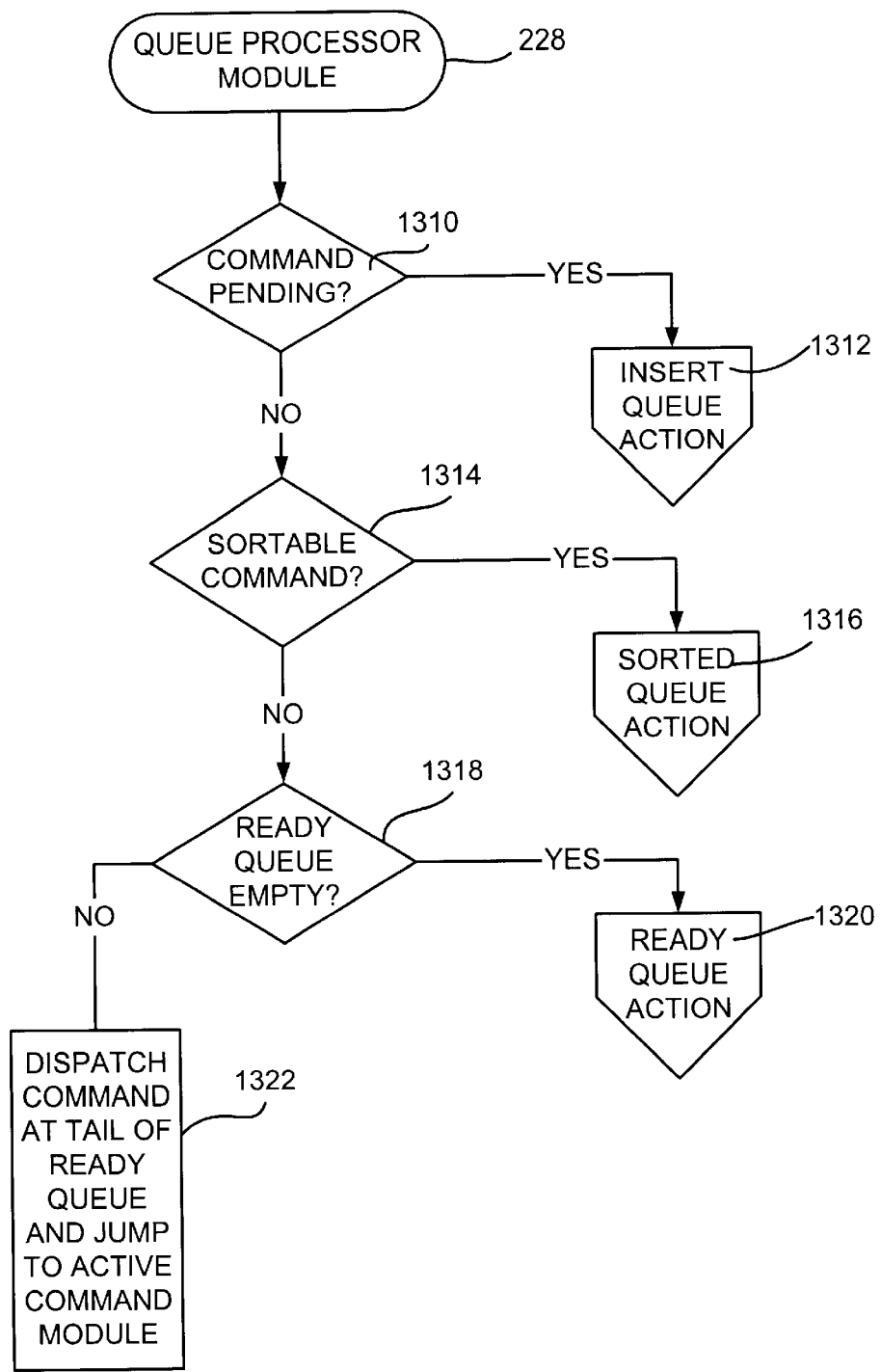
FIG. 13 illustrates an exemplary operational flow of a queue processor module of the disc drive control module shown module in FIG. 10 in accordance with a preferred embodiment of the present invention.

Following execution of the host module 224, the scheduler module launches the queue processor module 228. As shown in FIG. 13, upon the launch of the queue processor module 228, command pending detector 1310 checks its command pending flag to determine if there is a command pending. If a command is pending, the operation flow of the queue processor module 228 flows to insert queue action 1312 (discussed below). If a command is not pending, sortable command detector 1314 determines if a command is pending in the sorted queue 814 that requires processing. If a command which requires processing is pending in the sorted queue, the operation flow of the queue processor module 228 flows to sorted queue action 1316 (discussed below). If a command which requires processing is not pending in the sorted queue, ready queue empty detector 1318 determines if the ready queue 816 is empty. If the ready queue is empty, the operation flow of the queue processor module 228 flows to ready queue action 1320 (discussed below). Finally, if the ready queue is not empty, the command node at the tail of the ready queue is dispatched and the operation flow of the scheduler jumps directly to the active command module 232.

Figure 14:
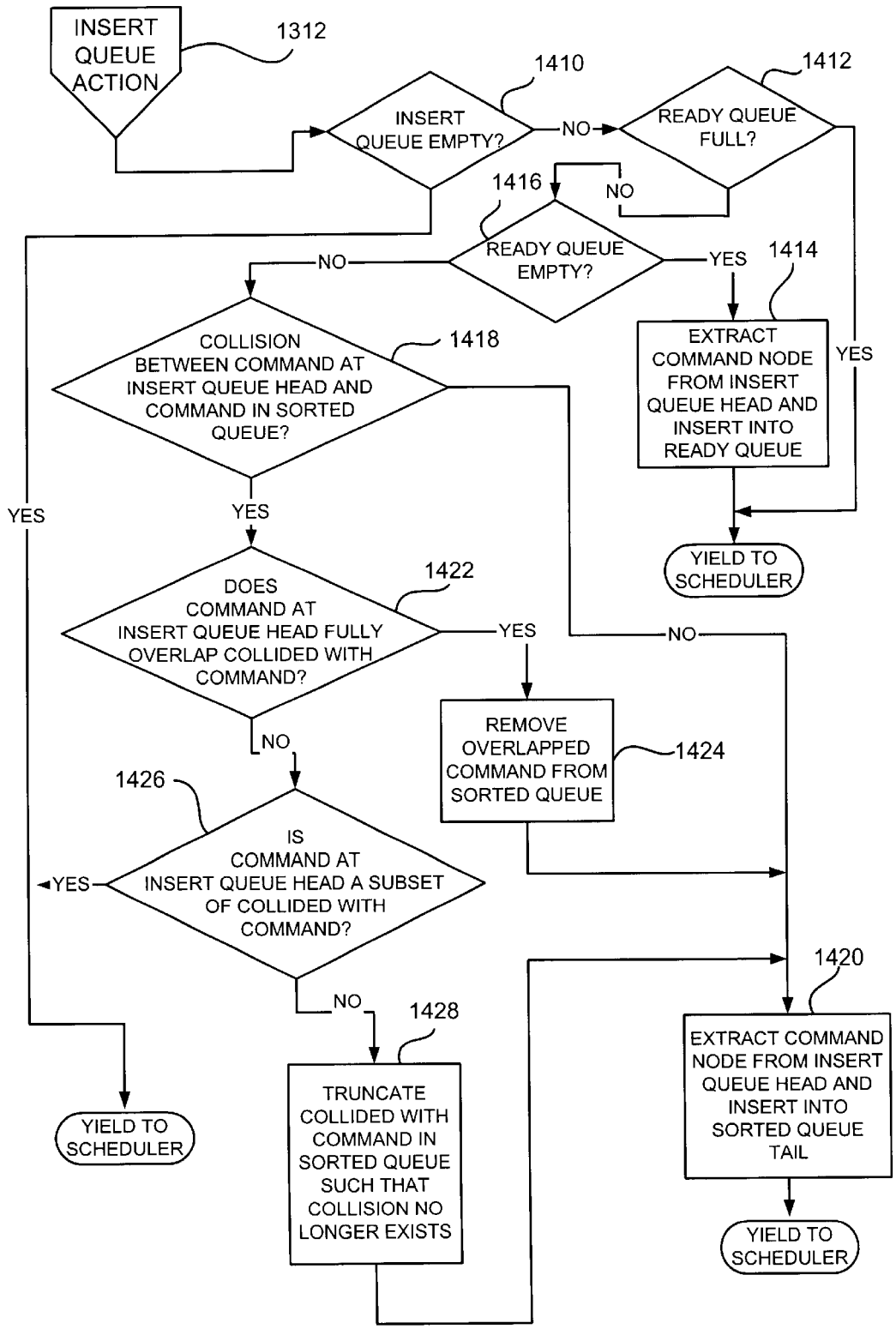
FIG. 14 illustrates an exemplary operational flow of an insert queue action of the queue processor module shown module in FIG. 13 in accordance with a preferred embodiment of the present invention.

As described above, if the command pending detector 1310 determines that a command is pending, the operational flow of the queue processor module flows to the insert queue action 1312. As shown in FIG. 14, upon entry into the insert queue action 1312, an insert queue empty detector 1410 determines or tests whether the insert queue 812 is empty. If the insert queue 812 is empty, the insert queue action 1312 is completed and the queue processor module 228 yields back to the scheduler module 222. If the insert queue 812 is not empty, a ready queue full detector 1412 determines or tests whether the ready queue 816 is full. If the ready queue 816 is full, the insert queue action 1312 is completed and the queue processor module 228 yields back to the scheduler module 222.

If the ready queue 816 is not full, a ready queue empty detector 1416 determines or tests whether the ready queue 816 is empty. If the ready queue 816 is empty, an extract operation 1414 extracts a command node from the head of the insert queue 812 and inserts that command into the ready queue 816. The insert queue action 1312 is then completed and the queue processor module 228 yields back to the scheduler module 222.

If the ready queue 816 is not empty, a collision detector 1418 determines or tests whether there is a collision between the command at the head of the insert queue 812 and a command in the sorted queue 814. If there is not a collision between the command at the head of the insert queue 812 and a command in the sorted queue 814, an extract operation 1420 extracts the command at the head of the insert queue 812 and inserts that command into the tail of the sorted queue 814, and insert queue action 1312 is then completed and the queue processor module 228 yields back to the scheduler module 222.

If there is a collision between the command at the head of the insert queue 812 and a command in the sorted queue 814, an overlap detector 1422 determines or tests whether the command at the head of the insert queue 812 fully overlaps the collided with command in the sorted queue 814. If the command at the head of the insert queue 812 fully overlaps the collided with command in the sorted queue 814, a remove operation 1424 removes the fully overlapped command from the sorted queue 814. The extract operation 1420 then extracts the command at the head of the insert queue 812 and inserts that command into the tail of the sorted queue 814, and the insert queue action 1312 is then completed and the queue processor module 228 yields back to the scheduler module 222.

If the command at the head of the insert queue 812 does not fully overlap the collided with command in the sorted queue 814, a subset detector 1426 determines or tests whether the command at the head of the insert queue 812 is a subset of the collided with command in the sorted queue 814. If the command at the head of the insert queue 812 is a subset of the collided with command in the sorted queue 814, insert queue action 1312 is then completed and the queue processor module 228 yields back to the scheduler module 222.

If the command at the head of the insert queue 812 is not a subset of the collided with command in the sorted queue 814, it can be assumed that the command at the head of the insert queue 812 partially overlaps the collided with command in the sorted queue 814. A truncate operation 1428 then truncates the command in the sorted queue. The extract operation 1420 then extracts the command at the head of the insert queue 812 and inserts that command into the tail of the sorted queue 814, and insert queue action 1312 is then completed and the queue processor module 228 yields back to the scheduler module 222.

Figures 15, 16:
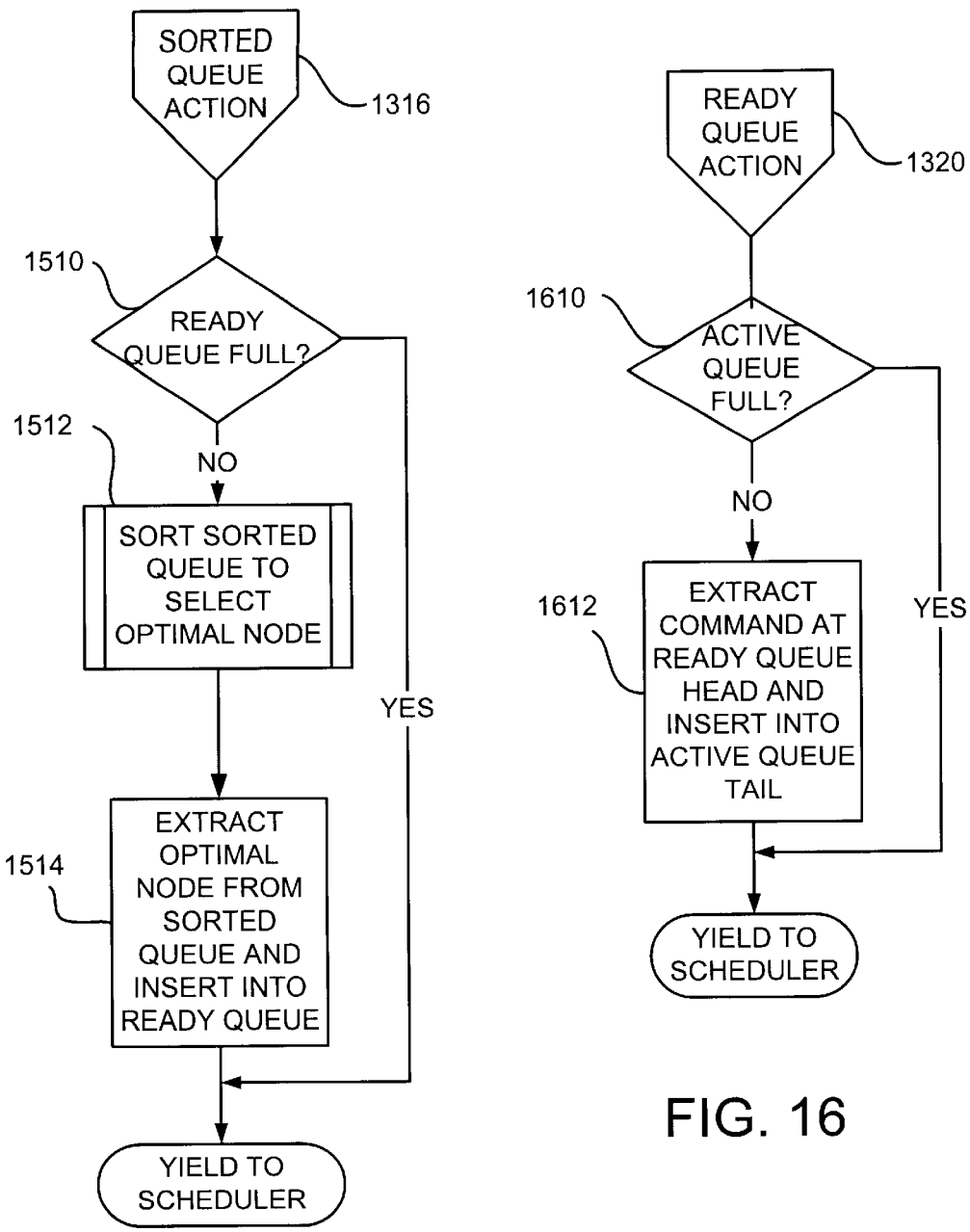
FIG. 15 illustrates an exemplary operational flow of an sorted queue action of the queue processor module shown module in FIG. 13 in accordance with a preferred embodiment of the present invention.
FIG. 16 illustrates an exemplary operational flow of an ready queue action of the queue processor module shown module in FIG. 13 in accordance with a preferred embodiment of the present invention.

As described above, if the command pending detector 1310 determines that a command is not pending, the sortable command detector 1314 determines if a sortable command is pending in the insert queue 812. If a sortable command is pending in the insert queue, the operational flow of the queue processor module 228 flows to the sorted queue action 1316. As shown in FIG. 15, upon entry into the sorted queue action 1316, a ready queue full detector 1510 determines or tests whether the ready queue 816 is full. If the ready queue 816 is full, the sorted queue action 1316 is completed and the queue processor module 228 yields back to the scheduler module 222. If the ready queue 816 is not full, a sort operation 1512 sorts the sorted queue 814 to determine the optimal node to be inserted into the ready queue 816.

As described above, if the command pending detector 1310 determines that a command is not pending, the sortable command detector 1314 determines if a sortable command is pending in the insert queue 812. If a sortable command is pending in the insert queue, the operational flow of the queue processor module 228 flows to the sorted queue action 1316. As shown in FIG. 15, upon entry into the sorted queue action 800, a ready queue full detector 1510 determines or tests whether the ready queue 816 is full. If the ready queue 816 is full, the sorted queue action 1316 is completed and the queue processor module 228 yields back to the scheduler module 222. If the ready queue 816 is not full, a sort operation 1512 sorts the sorted queue 814 to determine the optimal node to be inserted into the ready queue 816.

As described above, the sort operation 1512 typically will compare various fields within the command nodes in the sorted queue 814 to determine the preferred or optimal command node for a specified optimization. A number of different sorting algorithms may be used by the sort operation 1512 to determine which of the nodes in the sorted queue 814 is optimal. However, a Rotational Positioning Sorting (RPS) or traveling salesmen type algorithm is preferably used by the sort operation 1512 to the sorted queue 814. Once an optimal command node has been determined, an extract operation 1514 extracts the optimal command node from the sorted queue 814 and inserts the optimal command node into the ready queue 816. The sorted queue action 1316 is then completed and the queue processor module 228 yields back to the scheduler module 222.

As described above, if the sortable command detector 1314 determines that a sortable command is not pending in the insert queue 812, the ready queue empty detector 1318 determines if the ready queue 816 is empty. If the ready queue is empty, the operational flow of the queue processor module 228 flows to the ready queue action 1320. As shown in FIG. 16, upon entry into the ready queue action 1320, a active queue full detector 1610 determines or tests whether the active queue 818 is full. If the active queue 818 is full, the ready queue action 1320 is completed and the queue processor module 228 yields back to the scheduler module 222. If, however, the active queue 818 is not full, an extract operation 1612 extracts the command node at the head of the ready queue 816 and inserts that command node into the active queue 818. The ready queue manager routine 1320 is then completed and the queue processor module 228 yields back to the scheduler module 222.

Figure 17:
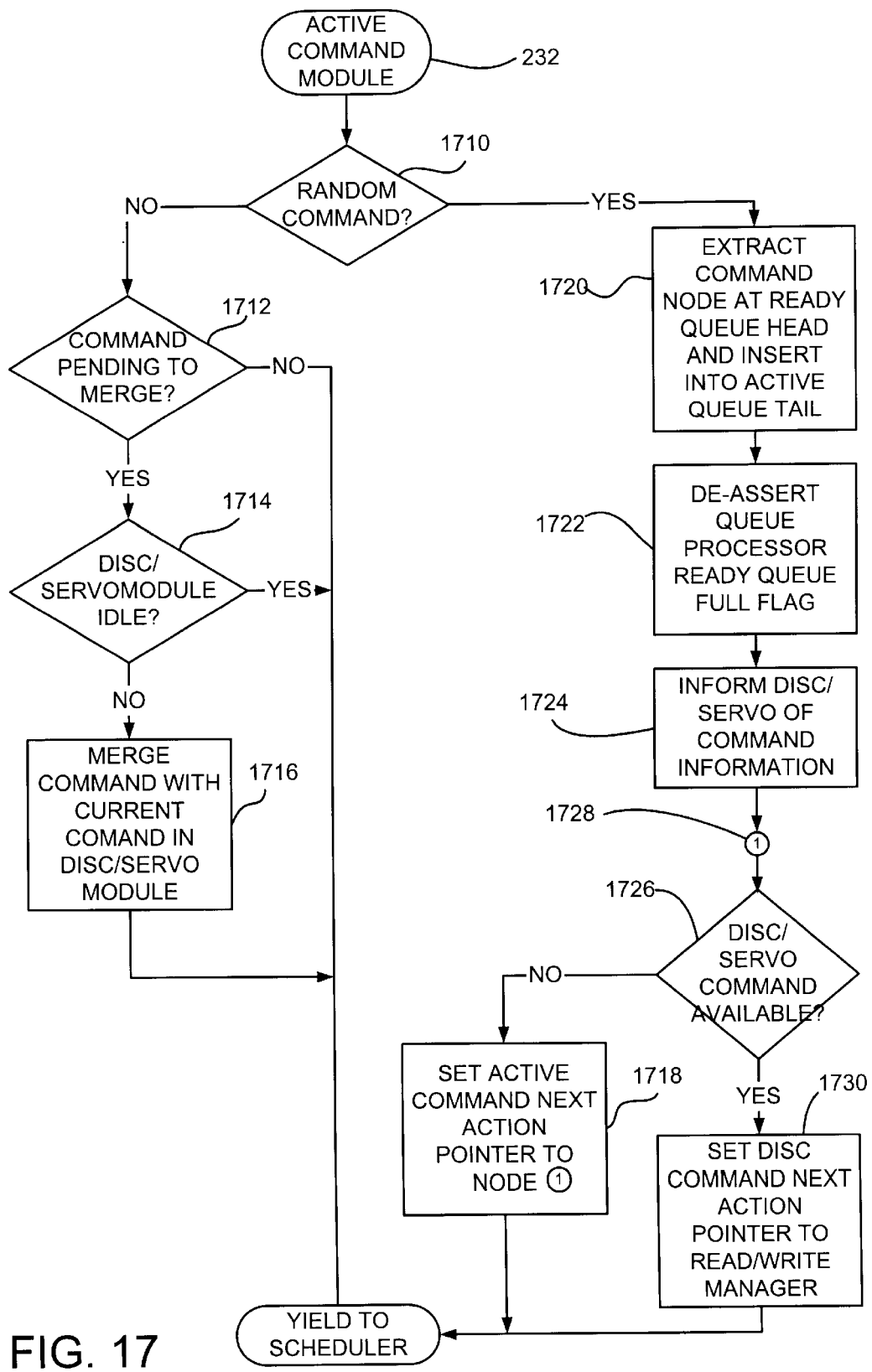
FIG. 17 illustrates an exemplary operational flow of an active command module of the disc drive control module shown module in FIG. 10 in accordance with a preferred embodiment of the present invention.

Following execution of the queue processor module 228, the scheduler module launches the active command module 232. As shown in FIG. 17, upon entry into the active command module 232 a random command detector 1710 determines if the command is a random command. The random command detector 1710 preferably makes this determination by comparing the ending logical block address (LBA) of the previous command to the starting LBA of the current command. If these LBAs are sequential then the commands are sequential. If the command is not random a command pending detector 1712 determines if there is a command pending which needs to be merged. If there is not a command pending which needs to be merged the active command module 232 yields back to the scheduler 222. If there is a command pending which needs to be merged a disc/servo module idle detector 1714 determines if the disc/servo module 236 is idle. If the disc/servo module 236 is idle the active command module 232 yields back to the scheduler 222. If the disc/servo module 236 is not idle a merge operation 1716 merges the command with the current command being handled by the disc/servo module 236 and the active command module 232 yields back to the scheduler 222.

If, upon entry into the active command module 232 the random command detector detects a random command, an extract operation 1720 extracts the command node at the head of the ready queue 816 and inserts the extracted command in the tail of the active queue 818. A de-assert operation 1722 then de-asserts a ready queue full flag in the queue processor module 228. A inform operation 1724 then informs the disc/servo module 236 of various information from the command, such as the cylinder, head, and sector where the command is to be read or written. Next, a disc/servo command available detector 1726 determines if the disc/servo action is currently available to handle the command. If the disc/servo action is not available, a set operation 1718 will set the next action pointer of the active command module to return to point 1 1728 the next time the active command module 232 is launched by the scheduler module 222. The active command module 232 then yields back to the scheduler 222. If the disc/servo action is available, a set operation 1730 sets the next action pointer in the disc/servo module to a read/write manager in the disc/servo module which controls access to the discs 108 of the disc drive for reads and writes and the active command module 232 then yields back to the scheduler 222.

Figure 18:
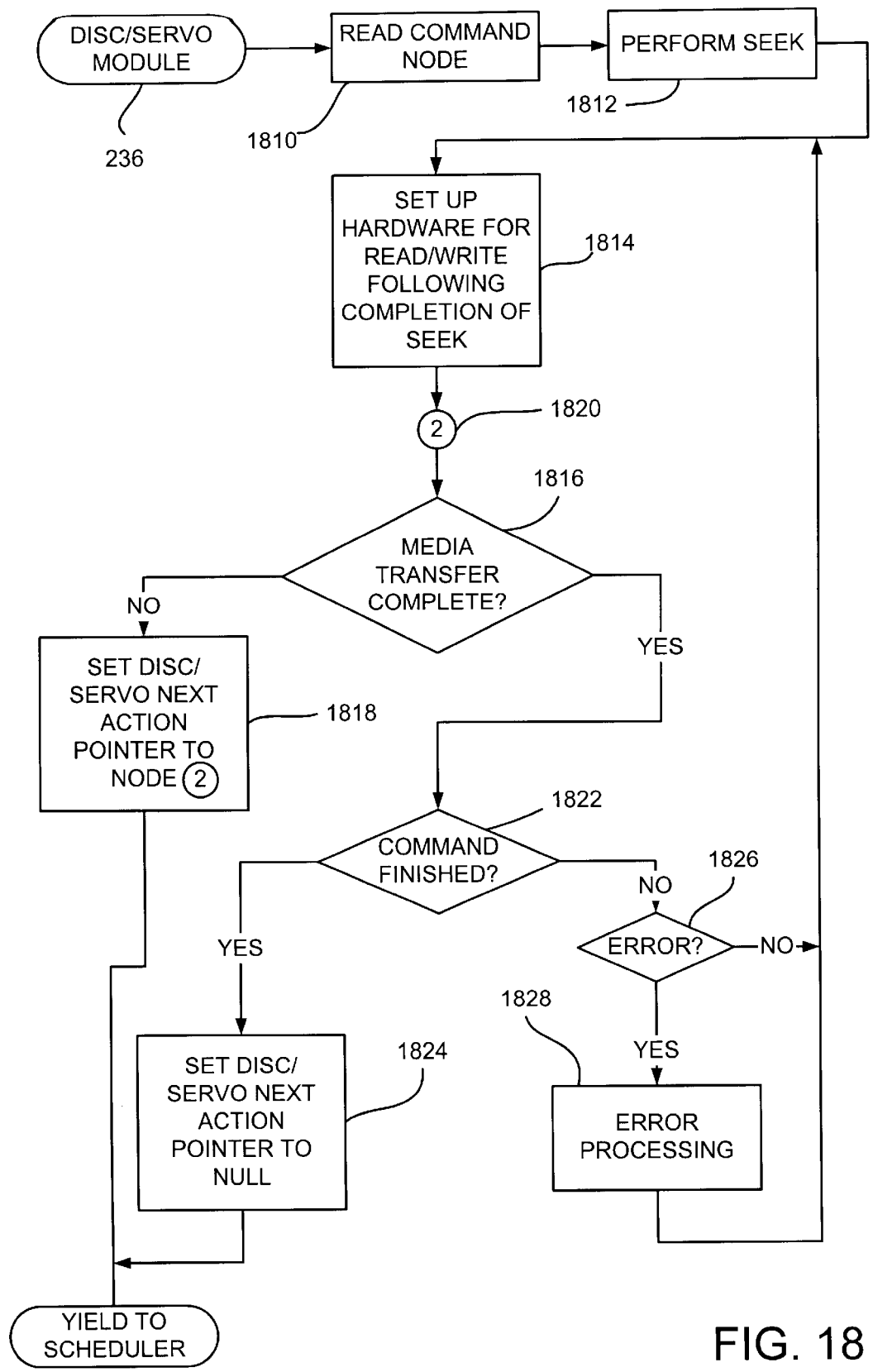
FIG. 18 illustrates an exemplary operational flow of a disc/servo module of the disc drive control module shown module in FIG. 10 in accordance with a preferred embodiment of the present invention.

Upon completion of the active command module 232, the scheduler module 222 launches the disc/servo module 236. As shown in FIG. 18, upon launch of the disc/servo module 236 a read command operation 1810 will read the command node currently being operated on by the disc/servo module 236. A seek operation 1812 will then direct the servo control module 218 to perform a seek to the address on the disc 108 of where the media transfer to the disc 108 (read or write) is to occur. Next, a set operation 1814 sets up the appropriate disc drive hardware, such as the read/write channel module 210 for reading or writing following the seek. A media transfer detector 1816 then determines if the most recent media transfer performed by the disc/servo module 236 has been completed. If the media transfer has not been completed, :a set operation will set the next action pointer of the disc/servo module to return to point 2 1820 the next time the disc/servo module 236 is launched by the scheduler module 222. The disc/servo module 236 will then yield back to the scheduler 222.

If the media transfer detector 1816 determines that the most recent media transfer has been completed, a command finished detector 1822 will determine if the most recent command executed by the disc/servo module has finished. If the command has not finished, an error detector will determine if an error has occurred in the disc/servo module 236. If no error has occurred, the operational flow of the disc/servo module will return to the set operation 1814. If an error has occurred, an error processing module will attempt to correct the error and the operational flow of the scheduler will return to the set operation 1814. If the command has finished, a set operation 1824 will set the next action pointer of the disc/servo module to null and the disc/ servo module will yield back to the scheduler module 222. After the disc/servo module has yielded back to the scheduler module 222, the scheduler module 222 will launch the host module 224, followed by the queue processor module 228, then the active command module 232, and so on. In this way, the scheduler module will continually launch each of the cooperative modules 224, 228, 232, and 236 in a round robin fashion.

Figure 19:
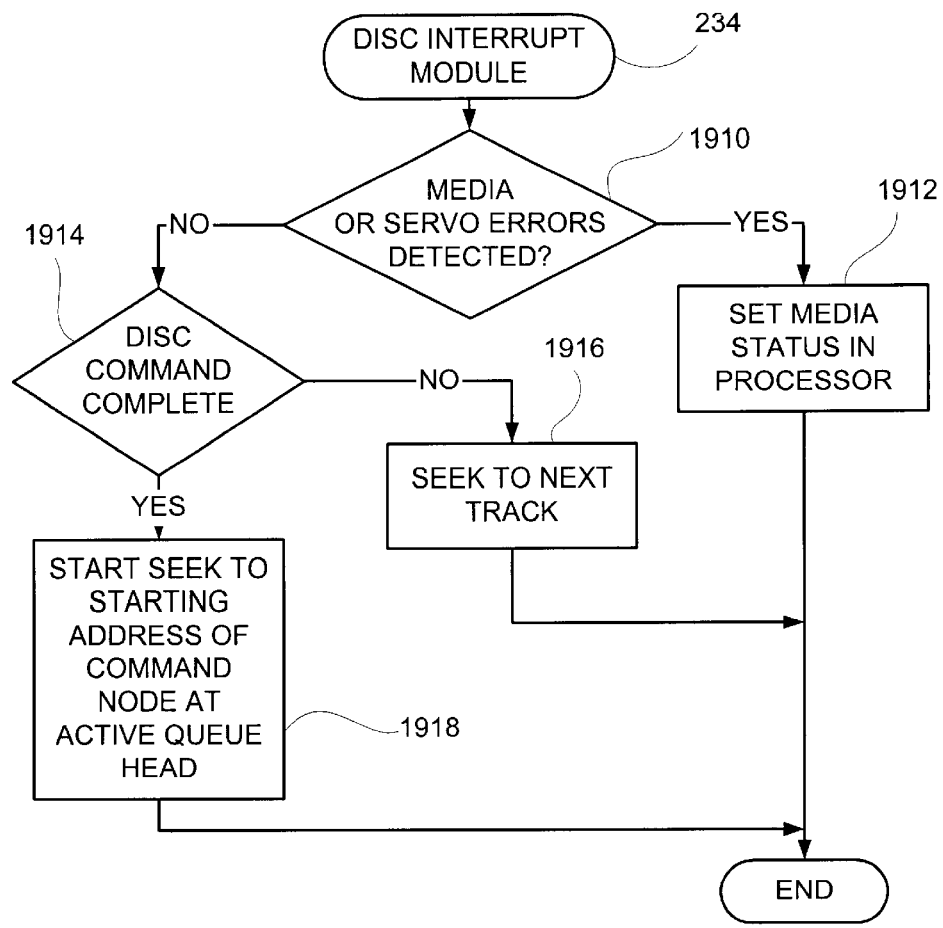
FIG. 19 illustrates an exemplary operational flow of a disc interrupt module of the disc drive control module shown module in FIG. 10 in accordance with a preferred embodiment of the present invention.

Turning now to the disc interrupt module, as shown in FIG. 19, the disc interrupt modules primary function is to detect media or servo errors. In general, the disk interrupt module 234 is a timing critical, preemptive module that checks for errors and sets up status for the disc/servo module 236 for the previous media transfer. If no errors are detected, and the command node currently being handled by the disc/servo module is not complete, the disc interrupt module 234 starts a seek to the next track on the disc to satisfy the command. This sends a command to the servo control module 218 before the next servo burst after the media operation is finished, thereby starting the seek to the next track as soon as possible, thus reducing latency and increasing the performance of the disc drive 100. The disk interrupt is initiated by hardware that manages the media operation and when the operation is complete or an error occurs it generates an interrupt which is sent to the processor module, and thus to the disc interrupt module 234.

As shown in FIG. 19, upon entry into the disc interrupt module 234, an error detector 1910 determines if either a media error or a servo error has occurred. Errors may include, for example, error correction code (ECC) errors, synch byte timeouts, off-track write problems, bad servo information which prevents the disc drive from writing a seek or timing-out, or an error which occurs if the drive is not ready in that it is spun down and cannot come ready, etc. If an error has occurred, a set operation 1912 sets the status of the media in the processor module 212. After the status has been set in the processor module 212 the disc interrupt module is ended.

If the error detector 1910 does not detect media or servo errors, a command complete detector 1914 determines if the last disc command has been completed. If the disc command has not been completed, the disc interrupt starts a seek to the next track which is to be accessed at 1916. The next track to be accessed may be calculated by software or hardware and depends on the format of the drive, i.e. cylinder serpentine, mini-surface serpentine etc. A disc drive defect list, as are known in the art, is preferably used in this calculation. In some disc drive formats the next track is always the next higher head until the maximum head is reached and then it goes to the next cylinder. In this type of disc drive, this occurs for even cylinders and the direction is reversed for odd heads. This is known as cylinder serpentine. If the disc command has been completed, a start seek operation 1918 starts a seek to the address of the command node at the head of the active queue 818. In this way, a seek is started as soon as possible, thus reducing the latency of the disc drive. Finally, the disc interrupt module is ended.

Figure 20:
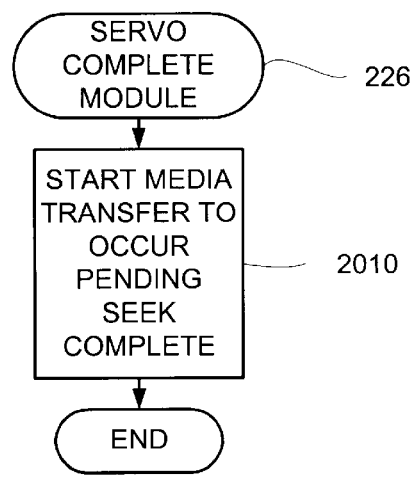
FIG. 20 illustrates an exemplary operational flow of a servo complete module of the disc drive control module shown module in FIG. 10 in accordance with a preferred embodiment of the present invention.

As shown in FIG. 20, the servo complete module 226 is a preemptive routine which executes once a seek is completed by the servo module. Upon entry into the servo complete module, start media operation 2010 starts the hardware that handles the media operation once a pending seek is complete.

In summary, in view of the foregoing discussion it will be understood that a first embodiment of the present invention provides a data storage device control module (such as 202) for controlling operational processes in a data storage device (such as 100). The control module preferably includes a number of non-preemptive modules (such as 224, 228, 232, and/or 236). Each of these non-preemptive operating modules is preferably operable to control a process within the data storage device. In addition, the data storage device control module preferably includes a scheduler module (such as 222) which is operable to schedule the execution of the non-preemptive modules in the data storage device control module. The data storage device control module also preferably includes a preemptive operating module (such as 226, 230, and/or 234), wherein the preemptive operating modules are operable to control a process within the data storage device to preempt the operation of the scheduler and the cooperative operating modules.

In this first embodiment of the present invention, each non-preemptive module preferably includes a next module indicator (such as 314, 316, 318, or 320) which indicates the non-preemptive module which is to be executed following the execution of a particular non-preemptive module. The scheduler module then schedules the execution of the non-preemptive modules in an order related to the next module indicators of the non-preemptive modules.

The preemptive operating module in the first embodiment is preferably responsive to an interrupt signal from a host computer (such as 200) which is operably connected to the data storage device control module. The data storage device control module also preferably further includes a processor module (such as 212) and a computer readable medium (such as 214). Additionally, each of the non-preemptive modules preferably comprises a processor executable routine stored on the computer readable medium and the scheduler module preferably comprises a processor executable routine stored on the computer readable medium.

Additionally, in this first embodiment the data storage device control module, the scheduler module preferably comprises a routine (such as 540, 650, or 770) operable to launch only the non-preemptive modules and execute the actions. In such a case, the routine launches the modules in an order determined by the next module indicators and the routine and, upon launch of a module, executes the action indicated by the next action indicator associated with the launched module.

Preferably, in this embodiment of the invention, the scheduler module routine includes the steps of launching a first non-preemptive module (such as 501), executing the action indicated by the next action indicator associated with the first non-preemptive module (such as 552), launching a second module indicated by the next module indicator associated with the first module (such as 503), and executing the action indicated by the next action indicator associated with the second module (such as 560).

A second embodiment of the present invention comprises a data storage device (such as 100) including a data storage disc (such as 108), an actuator assembly (such as 110) including a read head (such as 118) adjacent the disc, and a data storage device controller (such as 202) connected to the actuator assembly. In this second embodiment, the data storage device controller preferably includes a microprocessor (such as 212), a computer readable medium (such as 214), a plurality of non-preemptive operating modules (such as 224, 228, 232, and/or 236) each of which comprising microprocessor executable code operable to control a process within the data storage device controller, a non-preemptive module scheduler (such as 222) comprising microprocessor executable code, and a number of preemptive operating modules (such as 226, 230, and/or 234), each of which comprising microprocessor executable code operable to control a process within the data storage device controller. Preferably, the preemptive operating modules are operable to preempt the operation of the scheduler and the cooperative operating modules.

In this second embodiment, the data storage device preferably also includes a data structure (such as 800) stored on the computer-readable media. The data structure preferably includes a number of queues (such as 810, 812, 814, 816, and/or 818), each of which may store a command node. In this embodiment, the one of the non-preemptive operating modules is preferably a queue processor module (such as 228) which is operable to control the position of command nodes within the plurality of queues.

Preferably, this second embodiment includes a non-preemptive host module (such as 224) which includes a number of host actions, one which being operable to insert a command node into one of the queues. Additionally, this embodiment preferably includes a servo control module (such as 218) which controls the position of the actuator assembly, and a disc/servo module (such as 236) which may direct the servo control module to perform a seek to an area on the data storage disc. The data storage device of this embodiment preferably also includes a preemptive disc interrupt module (such as 234) which detects errors on the data storage disc.

The second embodiment of the present invention preferably includes a next module indicator (such as 314, 316, 318, and/or 320) associated with each non-preemptive module, wherein each of the next module indicators indicating the non-preemptive module which is to be launched after the completion of its respective non-preemptive module. Additionally, this embodiment preferably includes a next action indicator (such as 322, 324, 326, and/or 328) associated with each non-preemptive module, wherein each next action indicator indicates an action to be executed upon the launch of its respective non-preemptive module. The scheduler in this embodiment preferably includes a module launcher (such as 301, 303, 305, and/or 307) which launches the non-preemptive modules and execute the actions. The module launcher preferably launches the modules in an order determined by the next module indicators. The module launcher, upon launch of a module, preferably executes the action indicated by the next action indicator associated with the launched module.

The data storage device of this embodiment preferably also includes a preemptive host interrupt module (such as 230) which is operable to receive signals from a host computer (such as 100) which attached to the data storage device. The host interrupt preferably may modify the next action pointer of the host command in response to the signal received from the host computer.

The data structure in this embodiment of the invention preferably includes an insert queue (such as 812) and a sorted queue (such as 814), and the queue processor module preferably includes an insert queue action (such as 1312) which determines whether a command node within the insert queue collides with a command node in the sorted queue. The insert action also may correct collisions between command nodes in the insert queue and command nodes in the sorted queue. Finally, the insert action may extract a non-colliding command node from the insert queue and insert the non-colliding command node into the sorted queue.

The data storage device of this embodiment also preferably includes a ready queue (such as 816) and the queue processor module preferably includes a sorted queue action (such as 1316) which is operable for sorting command nodes in the sorted queue according to a predetermined scheme and extracting an optimal command node from the insert queue and inserting the extracted optimal node into the ready queue. The data structure preferably also includes an active queue (such as 818), and the queue processor module preferably includes a ready queue action (such as 1320) which is operable for extracting a command node from the ready queue and inserting the command node extracted from the ready queue into the active queue.

An alternate embodiment of the present invention provides a disc drive control module (such as 202) for controlling operational processes in a disc drive (such as 100). The disc drive controller preferably includes a plurality of non-preemptive modules (such as 224, 228, 232, and/or 236), each of which comprising at least one action operable to control a process within the disc drive. The disc drive control module also preferably includes a number of next module indicators (such as 314, 316, 318, and/or 320), each of which being associated with a respective non-preemptive module. Each of these next module indicators indicates the non-preemptive module which is to be executed after the completion of its associated non-preemptive module. A number of next action indicators (such as 322, 324, 326, and/or 328), each of which is associated with a respective non-preemptive module, and each which indicates the action to be executed upon the launch of its respective non-preemptive module are also included. A scheduler module (such as 222) operable to launch the non-preemptive modules and execute the actions is also preferably included in this alternate embodiment. The scheduler module preferably launches the non-preemptive modules in an order related to the next module indicators, and, upon launch of a non-preemptive module, executes the action indicated by the next action indicator associated with the launched non-preemptive module. Finally, this alternative embodiment preferably includes a plurality of preemptive operating modules (such as 226, 230, and 234), each of which is operable to control a process within the disc drive, and each of which is operable to preempt the operation of the scheduler module as well as the cooperative operating modules.

In the alternative embodiment, a data structure (such as 800) is preferably stored on a computer-readable media (such as 214) which is also preferably included in the embodiment. The data structure preferably includes a number of queues (such as 810, 812, 814, 816, and/or 818), each of which being operable to store at least one write command node. Also included in this embodiment is a queue processor module (such as 228), operable to control the position of write command nodes within the plurality of queues. This alternative embodiment preferably includes a processor module (such as 212). Finally, each of the preemptive operating modules, the non-preemptive operating modules, and the actions preferably comprises processor executable code.

Yet another embodiment of the invention comprises a controller (such as 202) for a data storage device (such as 100) which includes a number of preemptive control modules (such as 226, 230, and/or 234), a number of non-preemptive control modules (such as 224, 228, 232, and/or 236) and a scheduler means (such as 222) for scheduling the execution of only the non-preemptive control modules.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A data storage device control module for controlling operational processes in a data storage device, comprising:

a plurality of non-preemptive operating modules, each non-preemptive operating module being operable to control a process within the data storage device control module;

a scheduler module operable to schedule the execution of the non-preemptive modules in the data storage device control module; and a preemptive operating module operable to control another process within the data storage device control module and operable to preempt the operation of the scheduler and the non-preemptive operating modules.

2. The data storage device control module of claim 1, wherein each non-preemptive module includes a next module indicator which indicates a non-preemptive module to be executed following the execution of the non-preemptive module including the next module indicator, and wherein the scheduler module schedules the execution of the non-preemptive modules in an order related to the next module indicators of the non-preemptive modules.

3. The data storage device control module of claim 1, wherein the preemptive operating module is responsive to an interrupt signal from a host computer operably connected to the data storage device control module.

4. The data storage device control module of claim 1 further comprising:

a processor module and a computer readable medium;

each of the non-preemptive modules having a processor executable routine stored on the computer readable medium; and the scheduler module having a processor executable routine stored on the computer readable medium.

5. The data storage device control module of claim 4, wherein each of the non-preemptive modules comprises one or more processor executable actions stored on the computer readable medium and wherein the scheduler module comprises a processor executable routine stored on the computer readable medium.

6. The data storage device control module of claim 1 further comprising:
- a plurality of next module indicators, each next module indicator being associated with a respective non-preemptive module, each next module indicator indicating the non-preemptive module which is to be launched after the completion of its respective non-preemptive module; and
- a plurality of next action indicators, each next action indicator being associated with a respective non-preemptive module, each next action indicator indicating an action to be executed upon the launch of its respective non-preemptive module;
- wherein the scheduler comprises a routine operable to launch the non-preemptive modules and execute the actions, the routine launching the modules in an order determined by the next module indicators, the routine, upon launch of a module, executing the action indicated by the next action indicator associated with the launched module.

7. The data storage device control module of claim 6, wherein the routine comprises the steps of:
- (a) launching a first non-preemptive module;
- (b) executing an action indicated by the next action indicator associated with the first non-preemptive module;
- (c) launching a second module indicated by the next module indicator associated with the first module; and
- (d) executing an action indicated by the next action indicator associated the second module.

8. A data storage device comprising:
- a data storage disc;
- an actuator assembly adjacent the disc including a read/write head, the actuator assembly being operable to position over the data storage disc; and
- a data storage device controller operably connected to the actuator assembly, comprising:
  - a microprocessor;
  - computer readable medium;
  - a plurality of non-preemptive operating modules, each of the non-preemptive operating modules comprising microprocessor executable code operable to control a process within the data storage device controller;
  - a scheduler comprising microprocessor executable code stored on the computer readable medium, the scheduler scheduling the order in which the microprocessor executes the non-preemptive operating modules; and
  - a plurality of preemptive operating modules stored on the computer readable medium, each of the preemptive operating modules comprising microprocessor executable code operable to control a process within the data storage device controller, the preemptive operating modules being operable to preempt the operation of the scheduler and the non-preemptive operating modules.

9. The data storage device of claim 8, wherein the data storage device further comprises a data structure stored on a computer-readable media, the data structure comprising a plurality of queues, each of the queues being operable to store a command node, and wherein the plurality of non-preemptive operating modules includes a queue processor module operable to control the position of command nodes within the plurality of queues.

10. The data storage device of claim 8, wherein the plurality of non-preemptive operating modules includes a host module comprising a plurality of host actions, one of the plurality of host actions operable to insert a command node into a queue of a data structure.

11. The data storage device of claim 9, further comprising a servo control module operable to control the position of the actuator assembly, wherein the plurality of non-preemptive operating modules includes a disc/servo module operable to direct the servo control module to perform a seek to an area on the data storage disc.

12. The data storage device of claim 9, wherein the plurality of preemptive operating modules includes a disc interrupt module operable to detect errors on the data storage disc.

13. The data storage device of claim 8, further comprising:
- a plurality of next module indicators, each next module indicator being associated with a respective non-preemptive module, each next module indicator indicating the non-preemptive module which is to be launched after the completion of its respective non-preemptive module; and
- a plurality of next action indicators, each next action indicator being associated with a respective non-preemptive module, each next action indicator indicating an action to be executed upon the launch of its respective non-preemptive module;
- wherein the scheduler includes a module launcher operative to launch the non-preemptive modules and execute the actions, the module launcher launching the modules in an order determined by the next module indicators, the module launcher, upon launch of a module, executing the action indicated by the next action indicator associated with the launched module.

14. The data storage device of claim 13, wherein the plurality of preemptive operating modules includes a host interrupt module operable to receive signals from a host computer operably attached to the data storage device, the host interrupt being operable to modify the next action pointer of the host command in response to the signal received from the host computer.

15. The data storage device of claim 9, wherein the data structure comprises an insert queue, and a sorted queue, and wherein the queue processor module includes an insert queue action operable for determining whether a command node within the insert queue collides with a command node in the sorted queue, for correcting any collisions between a command node within the insert queue and a command node in the sorted queue, and for extracting a non-colliding command node from the insert queue and inserting the non-colliding command node into the sorted queue.

16. The data storage device of claim 15, wherein the data structure further comprises a ready queue, and wherein the queue processor modules includes a sorted queue action operable for sorting command nodes in the sorted queue according to a predetermined scheme and extracting an optimal command node from the insert queue and inserting the extracted optimal node into the ready queue.

17. The data storage device of claim 16, wherein the data structure further comprises an active queue, and wherein the queue processor module includes a ready queue action operable for extracting a command node from the ready queue and inserting the command node extracted from the ready queue into the active queue.

18. A disc drive control module for controlling operational processes in a disc drive, comprising:
- a plurality of non preemptive modules, each non-preemptive module comprising at least one action, each action being operable to control a process within the disc drive;
- a plurality of next module indicators, each next module indicator being associated with a respective non-preemptive module, each next module indicator indicating the non-preemptive module which is to be executed after the completion of its associated non-preemptive module;
- a plurality of next action indicators, each next action indicator being associated with a respective non-preemptive module, each next action indicator indicating an action to be executed upon the launch of its respective non-preemptive module; and
- a scheduler module operable to launch the non-preemptive modules and execute the actions, the scheduler module launching the non-preemptive modules in an order related to the next module indicators of the non-preemptive modules, the scheduler module, upon launch of a non-preemptive modules, executing the action indicated by the next action indicator associated with the launched non-preemptive module; and
- a plurality of preemptive operating modules, each of the preemptive operating modules operable to control a process within the disc drive, each of the preemptive operating modules being operable to preempt the operation of the scheduler module and the cooperative operating modules.

19. The disc drive control module of claim 18, further comprising a computer readable media and a data structure stored on the computer-readable media, the data structure comprising a plurality of queues, each of the queues being operable to store at least one write command node, and wherein the plurality of non-preemptive operating modules includes a queue processor module operable to control the position of write command nodes within the plurality of queues.

20. The disc drive control module of claim 19, further comprising a processor module, and wherein each of the preemptive operating modules, the non-preemptive operating modules, and the actions comprises processor executable code.

21. A controller for a data storage device comprising:
- a plurality of preemptive and non-preemptive control modules, wherein both the preemptive and non-preemptive control modules periodically execute from time to time; and
- a scheduler means for scheduling the execution of only the non-preemptive control modules, wherein the preemptive control modules are not scheduled for execution by a scheduler.

* * * * *